United States Patent [19]

Goodall et al.

[11] Patent Number: 5,705,503
[45] Date of Patent: Jan. 6, 1998

[54] ADDITION POLYMERS OF POLYCYCLOOLEFINS CONTAINING FUNCTIONAL SUBSTITUENTS

[76] Inventors: Brian Leslie Goodall, 3959 Clover Hill Rd., Akron, Ohio 44333; Wilhelm Risse, 93 The Maples, Bird Avenue, Clonskeagh, Dublin 14, Ireland; Joice P. Mathew, 27 Dennis Street, Clayton, Victoria 3168, Australia

[21] Appl. No.: 449,876

[22] Filed: May 25, 1995

[51] Int. Cl.$^6$ ..................................................... C08F 32/08
[52] U.S. Cl. .......................... 526/281; 526/171; 526/282; 526/284; 526/285; 526/303.1; 526/308; 526/309; 526/310; 526/319; 526/332; 526/347.1
[58] Field of Search .................................. 526/281, 282, 526/171, 284, 285, 308, 309, 347.1

[56] References Cited

U.S. PATENT DOCUMENTS

| | | |
|---|---|---|
| 3,330,815 | 7/1967 | McKeon et al. . |
| 4,100,046 | 7/1978 | Hodakowski et al. . |
| 5,164,469 | 11/1992 | Goto et al. . |
| 5,468,819 | 11/1995 | Goodall et al. ............... 526/171 |

FOREIGN PATENT DOCUMENTS

| | | |
|---|---|---|
| 0445755 | 9/1991 | European Pat. Off. . |
| 0504418 | 9/1992 | European Pat. Off. . |
| 0610813 | 8/1994 | European Pat. Off. . |
| 9514048 | 5/1995 | WIPO . |
| WO9514048 | 5/1995 | WIPO . |

OTHER PUBLICATIONS

S. Breunig and W. Risse, Transition–Metal–Catalyzed vinyl Addition Polymerizations of Norbornene Derivatives with Ester Groups, *Makromol. Chem.*, 193, 2915–2927 (1992).

R. G. Guy and B. L. Shaw, Olefin, Acetylene, and π–Allylic Complex of Transition Metals, *Advances in Inorganic Chemistry and Radiochemistry*, vol. 4, Academic Press Inc., New York, 77–131 (1962).

M. L. H. Green and P. L. I. Nagy, Allyl Metal Complexes, *Advances in Organometallic Chemistry*, vol. 2, Academic Press, New York, 325–363 (1964).

W. T. Dent, R. Long, and A. J. Wilkinson, Some Observations on the Preparation of π–Allylic Palladium Chloride Complexes, *J. Chem. Soc.*, 1585 (1964).

H. C. Volger, Synthesis of β–Alkyl and β–Aryl π–Allylic Palladium Halide Complexes and Its Mechanistic Aspects, *Rec. Trav. Chim. Pay–Bas*, 88, 225 (1969).

*Primary Examiner*—Fred Zitomer
*Attorney, Agent, or Firm*—Thoburn T. Dunlap

[57] ABSTRACT

Addition polymers containing functionally substituted polycyclic repeat units are prepared in the presence of a single or multicomponent catalyst system containing a palladium metal ion source. The catalysts are not poisoned by functional substituents and show good catalytic activity for polymerizing both endo and exo isomers of the substituted monomers. Optionally, the polymers are terminated with olefinic end groups.

5 Claims, No Drawings

ADDITION POLYMERS OF POLYCYCLOOLEFINS CONTAINING FUNCTIONAL SUBSTITUENTS

TECHNICAL FIELD OF THE INVENTION

The present invention generally relates to polycyclic addition polymers derived from functionally substituted norbornene-type monomers and to methods for preparing same. More specifically, this invention relates to functionally substituted addition polymers prepared in the presence of a single or multicomponent catalyst system containing a palladium metal ion source. The functionally substituted or functional norbornene-type monomers of the present invention are optionally polymerized in the presence of a chain transfer agent.

BACKGROUND OF THE INVENTION

High molecular weight polycyclic addition polymers having directly linked polycyclic repeating units without any internal backbone unsaturation are desirous from the standpoint of their inherent thermoxidative stability and high glass transition temperature profiles. Poly(bicyclo[2.2.1] hept-2-ene), commonly referred to as polynorbornene, is the simplest of these polymers. The polymer has been derived from the addition polymerization of bicyclo[2.2.1]hept-2-ene, i.e., norbornene, in the presence of a transition metal catalyst.

European Patent Application Publication 0 445 755 A2 ('755) aims to provide a transition metal catalyst system capable of catalyzing the addition polymerization of substituted and unsubstituted norbornene monomers as well as substituted and unsubstituted polycyclic monomers higher in cyclic structure than norbornene such as 1,4,5,8-dimethano-1,4,4a,5,8,8a-octahydronaphthalene (commonly known as tetracyclododecene). The substituent can be a hydrocarbyl group or a functional group containing a halogen, oxygen, or nitrogen atom. Disclosed oxygen and nitrogen containing groups are selected from alkoxy, phenoxy, alkoxycarbonyl, alkylamino, and cyano substituents. While various functionally substituted norbornene-type monomers are set forth in the '755 disclosure, it is noted that the corresponding functionalized polycyclic polymers are not exemplified anywhere in the specification. The only polymer embodiment exemplified is polynorbornene derived from the polymerization of norbornene in the presence of a two component catalyst system containing a transition metal component and an aluminoxane component.

Previous attempts to addition polymerize functional norbornene-type monomers via transition metal catalysis have resulted in polymers with low molecular weights. In U.S. Pat. No. 3,330,815 ('815), for example, attempts to polymerize functional norbornene-type monomers via palladium metal catalysis produce polymers with low molecular weights as evidenced in the disclosed Examples. Molecular weights above 10,000 Mn have not been prepared by the disclosed catalyst systems of the —815 patent.

Objectives in polymer synthesis still include the polymerization of monomers with polar functional groups. The incorporation of functional substituents into hydrocarbon polymer backbones is a useful method for modifying the chemical and physical properties of the polymer. It is known, however, that polymers containing functional substituents are difficult to prepare because of the propensity of the functional group to poison the catalyst. The free electron pairs on the functional substituent (e.g., nitrogen and oxygen atoms in particular) deactivate the catalyst by complexing with the active catalytic sites. Consequently, catalyst activity decreases and the polymerization of monomers is inhibited.

In addition to the inherent difficulties of polymerizing functional norbornene-type monomers discussed above, the stereo configuration of the substituent on the monomer plays an important role in the conversion of monomer to polymer. Breunig and Risse have reported that the rate of polymerization of the exo-isomer of an ester functionalized norbornene produced substantially higher yields of polymer than the corresponding endo-isomer when polymerized in the presence of a transition metal catalyst. *Makromol. Chem.* 193, 2915–2927 (1992). While it has been shown that transition metal catalysis of a functional norbornene is selective for the exo-isomer, it is the endo-isomer that is generally more economically available.

An economical and thus favored route for the preparation of functional norbornene monomers relies on the Diels-Alder reaction in which cyclopentadiene (CPD) or substituted CPD is reacted with a suitable dienophile at elevated temperatures to form the functionally substituted norbornene adduct generally shown by the following reaction scheme:

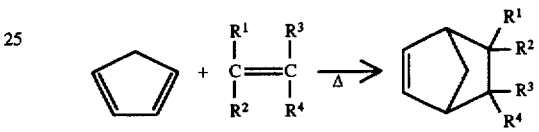

wherein $R^1$ and $R^4$ independently represent hydrogen, hydrocarbyl and a polar functional group, and at least one of $R^1$ to $R^4$ is a polar functional group.

Other norbornene-type adducts can be prepared by the thermal pyrolysis of dicyclopentadiene (DCPD) in the presence of a suitable dienophile. The reaction proceeds by the initial pyrolysis of DCPD to CPD followed by the Diels-Alder addition of CPD and the dienophile to give the adducts as shown below:

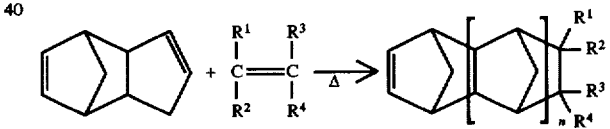

wherein $R^1$ to $R^4$ are as defined above and n represents the number of bicyclic repeating units.

The foregoing Diels-Alder addition reactions are stereoselective in that endo-isomer adducts are generally formed in major proportion. Given that transition metal addition catalysts favor the insertion of the exo-isomer of substituted norbornene-type monomers and that functional substituents have a propensity to poison the active catalytic sites, it is not surprising that prior catalytic systems have not been efficient in polymerizing these monomers to high conversion and molecular weights.

There is a need for transition metal catalyst systems that are able to catalyze the addition polymerization of functional norbornene-type monomers to high conversions and molecular weights without being inhibited by the functionality and/or stereoisomerism.

SUMMARY OF THE INVENTION

Accordingly, it is a general object of this invention to provide functionally substituted norbornene-type (NB-type) addition polymers having polycyclic repeating units derived from functionally substituted norbornene-type monomers (functional NB-type monomers).

It is another object of this invention to provide a functionally substituted NB-type addition polymer with a molecular weight over 10,000 ($M_n$).

It is still another object of this invention to provide a method for enhancing the molecular weight of a functionally substituted NB-type polymer formed in the presence of a single or multi-component catalyst system.

It is a further object of this invention to provide a catalytic system that is resistant to functional group deactivation.

It is another specific object of this invention to polymerize the endo-isomeric adducts of functionally substituted NB-type monomers to high molecular weights and conversions.

It is yet another object of this invention to provide functionally substituted NB-type addition polymers having a terminal end group derived from a chain transfer agent containing a terminal olefinic, non-styrenic, non-vinyl ether double bond, without the chain transfer agent being introduced into the polymer chain except at the end thereof, and wherein the double bond is preserved.

These and other objects of the invention are accomplished by polymerizing a reaction mixture for forming a functionally substituted NB-type polymer comprising at least one functional NB-type monomer, a solvent, a single or multi-component catalyst system each comprising a palladium ion source, and optionally a chain transfer agent (CTA) selected from a compound having a terminal olefinic double bond between adjacent carbon atoms, excluding styrenes, vinyl ethers, and conjugated dienes, and at least one of said adjacent carbon atoms having two hydrogen atoms attached thereto.

The term norbornene-type monomer or NB-type monomer as used throughout the present specification is meant to include norbornene and any higher cyclic derivative thereof so long as the monomer contains at least one norbornene moiety. The term functionally substituted norbornene-type monomer or functional NB-type monomer as used throughout this specification is meant to define NB-type monomers containing at least one functional substituent containing oxygen and/or nitrogen atoms as shown in the structural formula below:

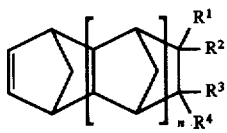

I wherein $R^1$ to $R^4$ independently represents hydrogen, hydrocarbyl, and a functional group containing oxygen and/or a nitrogen atoms and at least one of $R^1$ to $R^4$ is selected from said functional group, and n is 0, 1, 2, 3, or 4. The functional NB-type monomers of this invention will be described in further detail hereinbelow in the detailed description.

The structural repeating units derived from the NB-type monomers of this invention insert into the polymer backbone via linkages derived from the double bond (i.e., 2,3-enchainment). The repeating units are joined directly to one another without any intermediate linkages between the units. The polymer backbone is free of unsaturation.

From the foregoing it follows that the addition polymers containing repeating units (i.e., bicycloheptanylene, tetracyclododecanylene, hexacycloheptadecanylene, etc.) derived from these functional NB-type monomers can be represented as follows:

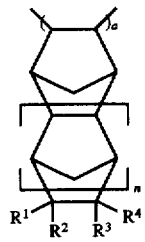

II wherein $R^1$ to $R^4$ and n are as defined above and a represents the number of repeating units in the polymer backbone.

This invention is directed to homopolymers and copolymers derived from functional NB-type monomers and copolymers derived from functional NB-type monomers and hydrocarbyl substituted B-type monomers (i.e., monomers that do not contain a functional substituent).

The polymers derived from functional NB-type monomers and functional NB-type monomers in combination with hydrocarbyl substituted NB-type monomers can be represented as follows:

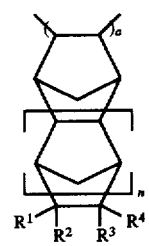

IIIa

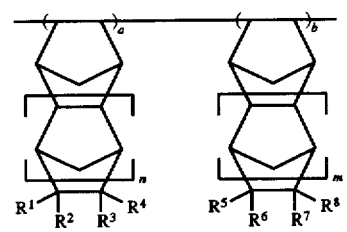

IIIb wherein $R^1$ to $R^4$ are as defined above, m and n independently represent 0, 1, 2, 3, or 4; $R^5$ to $R^8$ independently represent hydrogen and hydrocarbyl; and a and b independently represent the number of repeating units present in the polymer.

The functional NB-type polymers generally described under formulae II and III optionally can be terminated with an olefinic end group as shown in the structures below:

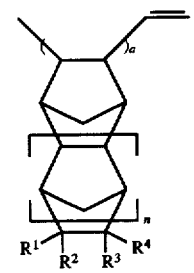

IVa

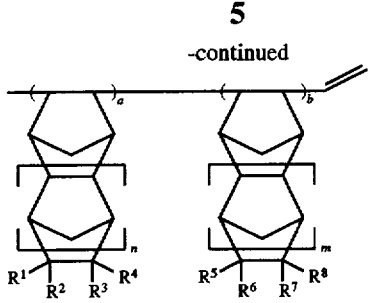

IVb wherein $R^1$ to $R^8$, m, n, a, and b are as described above. As will be readily recognized by those skilled in the art, the terminal olefinic end group (in this embodiment derived from ethylene) set forth under formula IV can be attached to repeat unit "a" if repeat unit "a" inserts at the terminal end of the growing polymer chain.

The olefinic end group is derived from a chain transfer agent selected from a compound having a terminal olefinic double bond between adjacent carbon atoms, excluding styrenes, vinyl ethers, and conjugated dienes, wherein at least one of the adjacent carbon atoms has two hydrogen atoms attached thereto. By terminal olefinic double bond is meant an olefin that has a $CH_2=C(R)_2$, wherein R independently represents hydrogen, a hydrocarbyl group, or a group as defined hereinbelow in the detailed description.

The functional NB-type polymers produced can be thermoformed, compression molded, blow molded, press molded, cast from solution, solvent processed, and sintered, and/or extruded, injection molded vacuum formed and fiber formed into various shapes and forms. End-use applications include automotive and transportation applications such as lighting, glazing, under hood components, body panels, bumpers, dash boards, and the like; medical applications such as fluid handling equipment, and the like; electrical and electronic applications such as computer housings, insulators, and the like; building and construction applications such as glazing, coatings, and the like; appliance panels and trim; consumer products such as housewares; microwave equipment; packaging; industrial parts and components; and optical components. Sheets, tubes and other forms of arbitrary length and cross-section may also be formed by extruding the polymer. Because of the controllable tool wt of the polymer, such forms may be adapted for use as membrane means for the separation of gas from liquid, as in pervaporation membranes; or, in the separation of liquids having different molecular weights as in nanofiltration or reverse osmosis membranes. In addition the functional NB-type polymers of this invention can be reacted with conventional compounds and polymers that contain pendant groups that are coreactive with the functionality on the NB-type repeating units. These functionalized polymers can be utilized in water swellable applications, as ionomers, adhesion applications as well as compatibilizers for other polymer systems.

DETAILED DESCRIPTION

The forgoing polymer systems are polymerized from reaction mixtures comprising a functional NB-type monomer or a functional NB-type monomer and a hydrocarbyl substituted NB-type monomer, a solvent, and a catalyst system containing a palladium ion source, and optionally a chain transfer agent. The catalyst system can be a preformed single component palladium-based catalyst or a multicomponent palladium-based catalyst.

SINGLE COMPONENT CATALYST SYSTEM

The single component catalyst system of this invention comprises a palladium cation complex and a weakly coordinating counteranion as represented by the following formula:

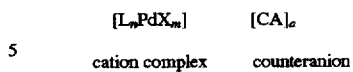

cation complex      counteranion wherein L represents a ligand containing 1, 2, or 3 π-bonds; X represents a ligand containing 1 σ-bond and between 0 to 3 π-bonds; n is 0, 1, or 2 and m is 0 or 1 and wherein n and m cannot both be 0 at the same time, and when m is 0, a is 2 and when m is 1, a is 1; and CA is a weakly coordinating counteranion.

The phrase "weakly coordinating counteranion" refers to an anion which is only weakly coordinated to the cation, thereby remaining sufficiently labile to be displaced by a neutral Lewis base. More specifically the phrase refers to an anion which when functioning as a stabilizing anion in the catalyst system of this invention does not transfer an anionic substituent or fragment thereof to the cation, thereby forming a neutral product. The counteranion is non-oxidative, non-reducing, non-nucleophilic, and relatively inert.

L is a neutral ligand that is weakly coordinated to the palladium cation complex. In other words the ligand is relatively inert and is readily displaced from the cation complex by the inserting monomer in the growing polymer chain. Suitable π-bond containing ligands include $(C_2-C_{12})$ monoolefinic (e.g., 2,3-dimethyl-2-butene), dioolefinic $(C_4-C_{12})$ (e.g., norbornadiene) and $(C_6-C_{20})$ aromatic moieties. Preferably ligand L is a chelating bidentate cyclo $(C_6-C_{12})$ diolefin, for example cyclooctadiene (COD) or dibenzo COD, or an aromatic compound such as benzene, toluene, or mesitylene.

Ligand X is selected from (i) a moiety that provides a single metal-carbon σ-bond (no π bonds) to the palladium in the cation complex or (ii) a moiety that provides a single metal carbon σ-bond and 1 to 3 π-bonds to the palladium in the cation complex. Under embodiment (i) the moiety is bound to the palladium by a single metal-carbon σ-bond and no π-bonds. Representative ligands defined under this embodiment include $(C_1-C_{10})$ alkyl moieties selected from methyl, ethyl, linear and branched moieties such as propyl, butyl, pentyl, neopentyl, hexyl, heptyl, octyl, nonyl and decyl and $(C_7-C_{15})$ aralkyl such as benzyl. Under embodiment (ii) generally defined above, the cation has a hydrocarbyl group directly bound to the palladium by a single metal-carbon σ-bond, and also by at least one, but no more than three π-bonds. By hydrocarbyl is meant a group that is capable of stabilizing the palladium metal cation complex by providing a carbon-metal σ-bond and one to three olefinic π-bonds that may be conjugated or non-conjugated. Representative hydrocarbyl groups are $(C_3-C_{20})$ alkenyl which may be non-cyclic, monocyclic, or polycyclic and can be substituted with linear and branched $(C_1-C_{20})$ alkoxy, $(C_6-C_{15})$ aryloxy or halo groups (e.g., Cl and F).

Preferably X is a single allyl ligand, or, a canonical form thereof, which provides a σ-bond and a π-bond; or a compound providing at least one olefinic π-bond to the metal, and a σ-bond to the metal from a distal carbon atom, spaced apart from either olefinic carbon atom by at least two carbon-carbon single bonds (embodiment iii).

It should be readily apparent to those skilled in the art that when ligand L or X is absent (i.e., n or m is zero), the palladium cation complex will be weakly ligated by the solvent in which the reaction was carried out. Representative solvents include but are not limited to halogenated hydrocarbons such as carbon tetrachloride, chloroform, dichloromethane, 1,2-dichloroethane and aromatic solvents such as benzene, toluene, mesitylene, chlorobenzene, and nitrobenzene, and the like. A more detailed discussion on appropriate solvents will follow.

Selected embodiments of the palladium cation complexes of the single component catalyst systems of this invention are shown below.

Structure V illustrates embodiment (i) wherein ligand X is a methyl group that is bound to the palladium metal via a single metal-carbon σ-bond, and ligand L is COD that is weakly coordinated to the palladium metal via two olefinic π-bonds.

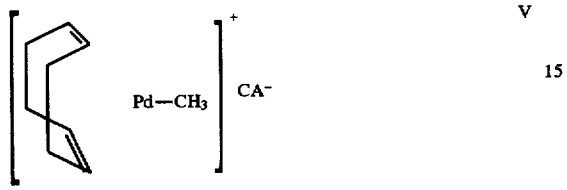

V

Structures VI, VII and VII illustrate various examples of embodiment (ii) wherein X is an allyl group that is bound to the palladium metal via a single metal-carbon σ-bond and at least one but no more than three π-bonds.

In Structure VI, L is not present but an aromatic group providing three π-bonds is weakly coordinated to the palladium metal; X is an allyl group providing a single metal-carbon σ-bond and an olefinic π-bond to the palladium.

In Structure VII, L is COD and X is an allyl group providing a metal-carbon σ-bond and an olefinic π-bond to the palladium.

Structure VIII illustrates an embodiment wherein ligand X is an unsaturated hydrocarbon group that provides o-metal-carbon σ-bond, a conjugated π-bond and two additional π-bonds to the palladium; L is absent.

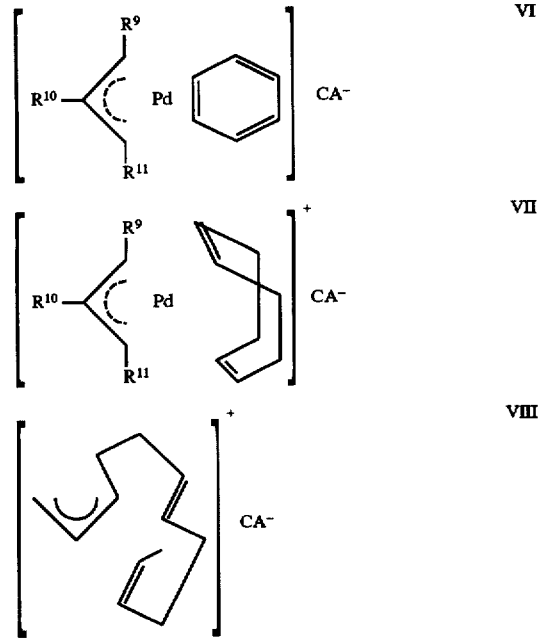

VI

VII

VIII

Substituents $R^9$, $R^{10}$, $R^{11}$ will be described in detail below.

Structures IX and X illustrate examples of embodiment (iii) wherein L is COD and X is a ligand that provides at least one olefinic π-bond to the palladium metal and a σ-bond to the metal from a distal carbon atom, spaced apart from either olefinic carbon atom by at least two carbon-carbon single bonds.

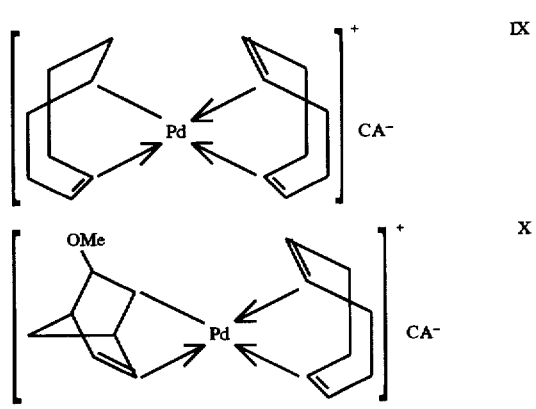

IX

X

The above-described palladium cation complexes are associated with a weakly coordinating or non-coordinating counteranion, CA⁻, which is relatively inert, a poor nucleophile and provides the cation complex with essential solubility in the reaction solvent. The key to proper anion design requires that it be labile, and stable and inert toward reactions with the cationic palladium complex in the final catalyst species and that it renders the single component catalyst soluble in the solvents of this invention. The anions which are stable toward reactions with water or Brøndted acids, and which do not have acidic protons located on the exterior of the anion (i.e., anionic complexes which do not react with strong acids or bases) possess the stability necessary to qualify as a stable anion for the catalyst system. The properties of the anion which are important for maximum lability include overall size, and shape (i.e., large radius of curvature), and nucleophilicity.

In general, a suitable anion may be any stable anion which allows the catalyst to be dissolved in a solvent of choice, and has the following attributes: (1) the anion should form stable salts with the aforementioned Lewis acid, Brønsted acids, reducible Lewis Acids, protonated Lewis bases, thallium and silver cations; (2) the negative charge on the anion should be delocalized over the framework of the anion or be localized within the core of the anion; (3) the anion should be a relatively poor nucleophile; and (4) the anion should not be a powerful reducing or oxidizing agent.

Anions that meet the foregoing criteria can be selected from the group consisting of a tetrafluoride of Ga, Al, or B; a hexafluoride of P, Sb, or As; perfluoro-acetates, propionates and butyrates, hydrated perchlorate; toluene sulfonates, and trifluoromethyl sulfonate; and substituted tetraphenyl borate wherein the phenyl ring is substituted with fluorine or trifluoromethyl moieties. Selected examples of counteranions include $BF_4^-$, $PF_6^-$, $AlF_3O_3SCF_3^-$, $SbF_6^-$, $SbF_5SO_3F^-$, $AsF_6^-$, trifluoroacetate ($CF_3CO_2^-$), pentafluoropropionate ($C_2F_5CO_2^-$), heptafluorobutyrate ($CF_3CF_2CF_2CO_2^-$), perchlorate ($ClO_4^-\cdot H_2O$), p-toluenesulfonate ($p\text{-}CH_3C_6H_4SO_3^-$) and tetraphenyl borates represented by the formula:

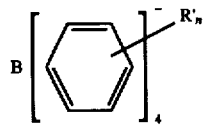

wherein $R'_n$ independently represents hydrogen, fluorine and trifluoromethyl and n is 1 to 5.

Preferred single component catalysts of the present invention are represented by the formula:

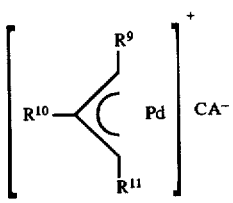

XI

The catalyst comprises a π-allylpalladium complex with a weakly coordinating counteranion. The allyl group of the cation complex is provided by a compound containing allylic functionality which functionality is bound to the palladium by a single carbon-palladium σ-bond and an olefinic π-bond. Surprisingly, it has been found that these single component catalysts wherein the palladium metal of the cation complex is devoid of ligands other than the allyl functionality (i.e., $L_n=0$), exhibit excellent activity for the polymerization of functional NB-type monomers. As discussed above, it will be understood that the catalysts are solvated by the reaction diluent which diluent can be considered very weak ligands to the palladium metal in the cation complex.

Sub stituents $R^9$, $R^{10}$, and $R^{11}$ on the allyl group set forth above in Structures VI, VII, and XI are each wherein $R^9$, $R^{10}$, and $R^{11}$ are each 'independently hydrogen, branched or unbranched ($C_1$–$C_5$) alkyl such as methyl, ethyl, n-propyl, isopropyl, and t-butyl, ($C_6$–$C_{14}$) aryl, such as phenyl and naphthyl, ($C_7$–$C_{10}$) aralkyl such as benzyl, —COOR$^{13}$, —(CH$_2$)$_n$OR$^{13}$, Cl and ($C_5$–$C_6$) cycloaliphatic, wherein $R^{13}$ is ($C_1$–$C_5$) alkyl, such as methyl, ethyl, n-propyl, isopropyl, n-butyl and i-butyl, and n is 1 to 5.

Optionally, any two of $R^9$, $R^{10}$, and $R^{11}$ may be linked together to form a cyclic- or multi-cyclic ring structure. The cyclic ring structure can be carbocyclic or heterocyclic. Preferably any two of $R^9$, $R^{10}$, and $R^{11}$ taken together with the carbon atoms to which they are attached form rings of 5 to 20 atoms. Representative heteroatoms include nitrogen, sulfur and carbonyl. Illustrative of the cyclic groups with allylic functionality are the following structures:

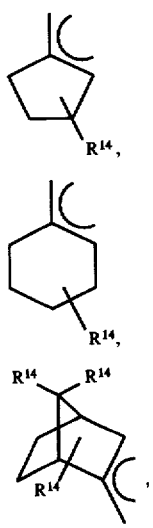

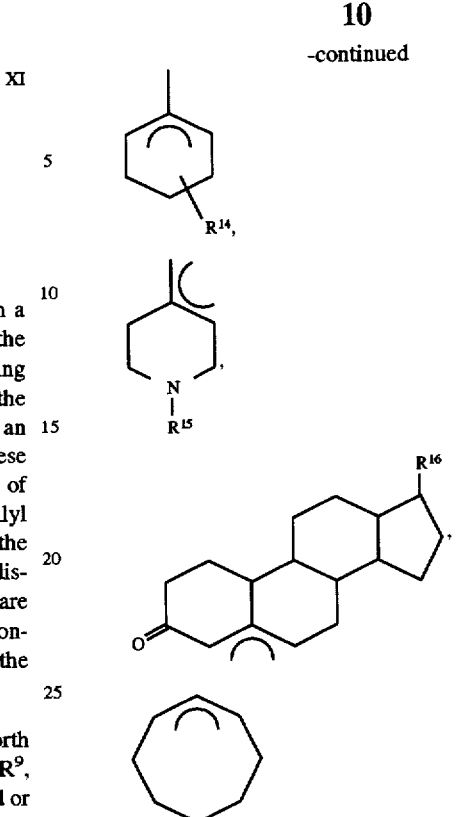

wherein $R^{14}$ is hydrogen, linear or branched ($C_1$–$C_5$) alkyl such as methyl, ethyl, n-propyl, isopropyl, n-butyl, isobutyl, and pentyl, $R^{15}$ is methylcarbonyl, and $R^{16}$ is linear or branched ($C_1$–$C_{20}$) alkyl. Counteranion CA⁻ is defined as above.

Additional examples of π-allyl metal complexes are found in R. G. Guy and B. L. Shaw, H. A. Skinner *Advances Inorganic Chemistry and Radiochemistry*, Vol. 4, Academic Press Inc., New York, 1962; J. Birmingham, E. de Boer, M. L. H. Green, R. B. King, R. Köster, P. L. I. Nagy, G. N. Schrauzer, *Advances in Organometallic Chemistry*, Vol. 2, Academic Press Inc., New York, 1964; W. T. Dent, R. Long and A. J. Wilkinson, I. Chem. Soc., (1964) 1585; and H. C. Volger, Rec. Tray. Chim. Pay Bas, 88 (1969) 225; which are all hereby incorporated by reference.

The single component catalyst of this invention can be prepared by combining a ligated palladium halide component with a salt that provides the counteranion for the subsequently formed palladium cation complex. The ligated palladium halide component, counteranion providing salt, and optional π-bond containing component, e.g., COD, are combined in a solvent capable of solvating the formed single component catalyst. The solvent utilized is preferably the same solvent chosen for the reaction medium. The catalyst can be preformed in solvent or can be formed in situ in the reaction medium.

Suitable counteranion providing salts are any salts capable of providing the counteranions discussed above. For example, salts of sodium, lithium, potassium, silver, thallium, and ammonia, wherein the anion is selected from the counteranions (CA⁻) defined previously. Illustrative counteranion providing salts include TlPF$_6$, AgPF$_6$, AgSbF$_6$, LiBF$_4$, NH$_4$PF$_6$, KAsF$_6$, AgC$_2$F$_5$CO$_2$, AgBF$_4$ AgCF$_3$CO$_2$, AgClO$_4$—H$_2$O, AgAsF$_6$, AgCF$_3$CF$_2$CF$_2$CO$_2$, AgC$_2$F$_5$CO$_2$, and

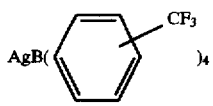

The specific catalyst: [allyl-Pd-COD]⁺PF₆⁻ is preformed by first forming a neutral Pd [COD]₂ complex, reacting the complex with an allylbromide to generate the ligated palladium halide component, i.e., bis(allyl Pd bromide), which is then subjected to scission with a halide abstracting agent in the form of a counteranion providing salt, i.e., TlPF₆. The reaction sequence is written as follows:

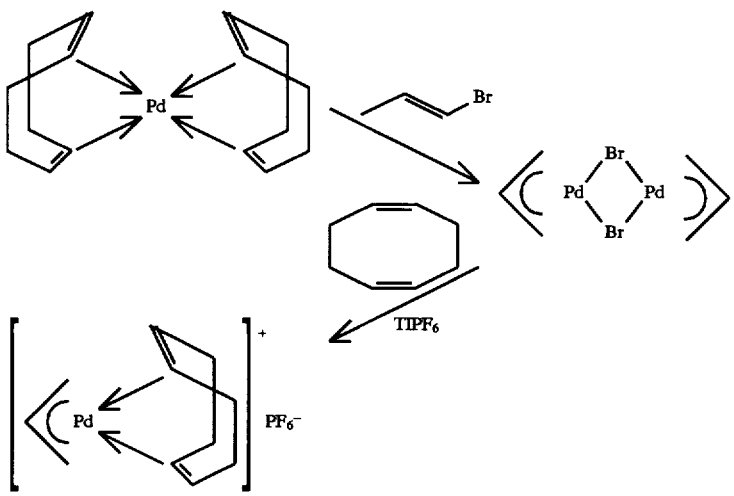

When partitioned, only one COD ligand remains, which is bonded by two π-bonds to the palladium. The allyl functionality is bonded by one metal-carbon σ-bond and one π-bond to the palladium.

For the preparation of the preferred π-allyl palladium/counteranion single component catalysts represented in structure XI above, allylpalladium chloride is combined with the desired counteranion providing salt, preferably silver salts of the counteranion, in an appropriate solvent. The chloride ligand comes off the allyl palladium complex as a precipitate of silver chloride (AgCl) which is filtered out of the solution. The allylpalladium cation complex/counteranion single component catalyst remains in solution. The palladium metal is devoid of any ligands apart from the allylic functionality.

Multicomponent Catalyst System

The multicomponent catalyst system embodiment of the present invention comprises a palladium metal ion source, one or both of an organoaluminum compound, and a third component.

The palladium metal ion source is selected from a compound containing palladium. There are no restrictions on the palladium compound as long as it provides a source of catalytically active palladium metal ions. Preferably, the palladium compound is soluble or can be made to be soluble in the reaction medium.

The palladium compound comprises ionic and/or neutral ligand(s) bound to the palladium metal. The ionic and neutral ligands can be selected from a variety of monodentate, bidentate, or multidentate moieties and combinations thereof.

Representative of the ionic ligands that can be bonded to the palladium metal to form the palladium compound are anionic ligands selected from the halides such as chloride, bromide, iodide or fluoride ions; pseudohalides such as cyanide, cyanate, thiocyanate, hydride; carbanions such as branched and unbranched ($C_1$–$C_{40}$) alkylanions, phenyl anions; cyclopentadienylide anions; π-allyl groupings; enolates of β-dicarbonyl compounds such as acetylacetonate, 2,4-pentanedionate and halogenated acetylacetonoates such as 1,1,1,5,5,5-hexafluoro-2,4-pentanedionate, 1,1,1-trifluoro-2,4,pentanedionate; anions of acidic oxides of carbon such as carboxylates and halogenated carboxylates (e.g., acetates, 2-ethylhexanoate, neodecanoate, trifluoroacetate, etc.) and oxides of nitrogen (e.g., nitrates, nitrites, etc.) of bismuth (e.g., bismuthate, etc.), of aluminum (e.g., aluminates, etc.), of silicon (e.g., silicate, etc.), of phosphorous (e.g., phosphates, phosphites, phosphines, etc.) of sulfur (e.g., sulfates such as triflate, p-toluene sulfonate, sulfites, etc.); ylides; amides; imides; oxides; phosphides; sulfides; ($C_6$–$C_{24}$) aryloxides, ($C_1$–$C_{20}$) alkoxides, hydroxide, hydroxy ($C_1$–$C_{20}$) alkyl; catechols; oxalate; chelating alkoxides and aryloxides. Palladium compounds can also contain complex anions such as PF₆⁻, AlF₃O₃SCF⁻₃, SbF₆⁻ and compounds represented by the formulae:

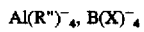

wherein R" and X independently represent a halogen atom selected from Cl, F, I, and Br, or a substituted or unsubstituted hydrocarbyl group. Representative of hydrocarbyl are ($C_1$–$C_{25}$) alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonodecyl, eicosyl, heneicosyl, docosyl, tricosyl, tetracosyl, pentacosyl, and isomeric forms thereof; ($C_2$–$C_{25}$) alkenyl such as vinyl, allyl, crotyl, butenyl, pentenyl, hexenyl, octenyl, nonenyl, decenyl, undecenyl, dodecenyl, tridecenyl, tetradecenyl pentadecenyl, hexadecenyl, heptadecenyl, octadecenyl, nonadecenyl, pentacosenyl, and isomeric forms thereof. ($C_6$–$C_{25}$) aryl such as phenyl, tolyl, xylyl, naphthyl, and the like; ($C_7$–$C_{25}$) aralkyl such as benzyl, phenethyl, phenpropyl, phenbutyl, phenhexyl, napthoctyl, and the like; ($C_3$–$C_8$) cycloalkyl such as cyclopropyl, cyclobutyl, cyclopentyl, cyclohexyl, cycloheptyl, cyclooctyl, 2-norbornyl, 2-norbonenyl, and the like. In addition to the above definitions X represents the radical:

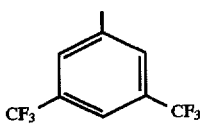

The term substituted hydrocarbyl means the hydrocarbyl group as previously defined wherein one or more hydrogen atoms have been replaced with a halogen atom such as Cl, F, Br, and I (e.g., as in the perfluorophenyl radical); hydroxyl; amino; alkyl; nitro; mercapto, and the like.

Palladium compounds can also contain cations such as, for example, organoammonium, organoarsonium, organophosphonium, and pyridinium compounds represented by the formulae:

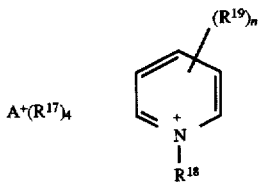

wherein A represents nitrogen, arsenic, and phosphorous and the $R^{17}$ radicals can be independently selected from hydrogen, branched or unbranched ($C_1$–$C_{20}$) alkyl, branched or unbranched ($C_2$–$C_{20}$) alkenyl, and ($C_5$–$C_6$) cycloalkyl, e.g., cyclopentyl, cyclohexyl, cycloheptyl, cyclooctyl, and the like. $R^{18}$ and $R^{19}$ are independently selected from hydrogen, branched and unbranched ($C_1$–$C_{50}$) alkyl, branched and unbranched ($C_2$–$C_{50}$) alkenyl and ($C_5$–$C_{16}$) cycloalkyl groups as defined above; and n is 1 to 5, preferably n is 1, 2, or 3, most preferably n is 1. The $R^{19}$ radicals preferably are attached to positions 3, 4, and 5 on the pyridine ring.

It should be noted that increasing the sum of the carbon atoms contained in the $R^{17}$ radicals confers better solubility of the transition metal compound in organic media such as organic solvents and NB-functional monomer. Preferably, the $R^{17}$ radicals are selected from ($C_1$–$C_{18}$) alkyl groups wherein the sum of carbon atoms for all $R^{17}$ radicals is 15 to 72, preferably 25 to 48, more preferably 21 to 42. The $R^{18}$ radical is preferably selected from branched and unbranched ($C_1$–$C_{50}$) alkyl, more preferably ($C_{10}$–$C_{40}$) alkyl. $R^{19}$ is preferably selected from branched and unbranched ($C_1$–$C_{40}$) alkyl, more preferably ($C_2$–$C_{30}$) alkyl.

Specific examples of organoammonium cations include tridodecylammonium, methyltricaprylammonium, tris(tridecyl)ammonium and trioctylammonium. Specific examples of organoarsonium and organophosphonium cations include tridodecylarsonium and phosphonium, methyltricaprylarsonium and phosphonium, tris(tridecyl)arsonium and phosphonium, and trioctylarsonium and phosphonium. Specific pyridinium cations include eicosyl-4-(1-butylpentyl)pyridinium, docosyl-4-(13-pentacosyl)pyridinium, and eicosyl-4-(1-butylpentyl)pyridinium.

Suitable neutral ligands which can be bonded to the palladium transition metal are the olefins; the acetylenes; carbon monoxide; nitric oxide, nitrogen compounds such as ammonia, alkylisocyanide, alkylisocyanate, alkylisothiocyanate; pyridines and pyridine derivatives (e.g., 1,10-phenanthroline, 2,2'-dipyridyl), 1,4-dialkyl-1,3-diazabutadienes, 1,4-diaryl-diazabutadienes amines such as represented by the formulae:

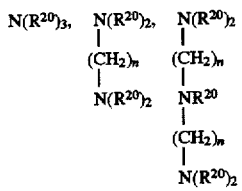

wherein $R^{20}$ is independently hydrocarbyl or substituted hydrocarbyl as previously defined and n is 2 to 10. Ureas; nitriles such as acetonitrile, benzonitrile and halogenated derivatives thereof; organic ethers such as dimethyl ether of diethylene glycol, dioxane, tetrahydrofuran, furan diallyl ether, diethyl ether, cyclic ethers such as diethylene glycol cyclic oligomers; organic sulfides such as thioethers (diethyl sulfide); arsines; stibines; phosphines such as triarylphosphines (e.g., triphenylphosphine), trialkylphosphines (e.g., trimethyl, triethyl, tripropyl, tripentacosyl, and halogenated derivatives thereof), bis(diphenylphosphino)ethane, bis(diphenylphosphino)propane, bis(dimethylphosphino)propane, bis(diphenylphosphino)butane, (S)-(–)2,2'-bis(diphenylphosphino)-1,1'-binaphthyl, (R)-(+)-2,2'-bis(diphenylphosphino)-1,1'-binaphthyl, and bis(2-diphenylphosphinoethyl)phenylphosphine; phosphine oxides, phosphorus halides; phosphites represented by the formula:

$$P(OR^{20})_3$$

wherein $R^{20}$ independently represents a hydrocarbyl or substituted hydrocarbyl as previously defined; phosphorus oxyhalides; phosphonates; phosphonites, phosphinites, ketones; sulfoxides such as ($C_1$–$C_{20}$) alkylsulfoxides; ($C_6$–$C_{20}$) arylsulfoxides, ($C_7$–$C_{40}$)alkarylsulfoxides, and the like. It should be recognized that the foregoing neutral ligands can be utilized as optional third components as will be described hereinbelow.

Examples of palladium metal compounds suitable as the palladium ion source include: palladium ethylhexanoate, trans-Pd $Cl_2(PPh_3)_2$, palladium (II) bis(trifluoroacetate), palladium (II) bis(acetylacetonate), palladium (II) 2-ethylhexanoate, $Pd(acetate)_2(PPh_3)_2$, palladium (II) bromide, palladium (II) chloride, palladium (II) iodide, palladium (II) oxide, monoacetonitriyletris(triphenylphosphine) palladium (II) tetrafluoroborate, tetrakis(acetonitrile) palladium (II) tetrafluoroborate, dichlorobis(acetonitrile) palladium (II), dichlorobis(triphenylphosphine) palladium (II), dichlorobis(benzonitrile) palladium (II), palladium acetylacetonate, palladium bis(acetonitrile) dichloride, palladium bis(dimethylsulfoxide) dichloride.

The organoaluminum component of the multicomponent catalyst system of the present invention is represented by the formula:

$$AlR^{21}_{3-x}Q_x$$

wherein $R^{21}$ independently represents branched and unbranched ($C_1$–$C_{20}$)alkyl, ($C_6$–$C_{24}$)aryl, ($C_7$–$C_{20}$)aralkyl, ($C_3$–$C_{10}$)cycloalkyl; Q is a halide or pseudohalide selected from chlorine, fluorine, bromine, iodine, branched and unbranched ($C_1$–$C_{20}$)alkoxy, ($C_6$–$C_{24}$)aryloxy; and x is 0 to 2.5, preferably 0 to 2.

Representative organoaluminum compounds include trialkylaluminums such as trimethylaluminum, triethylaluminum, tripropylaluminum, triisopropylaluminum, triisobutylaluminum, tri-2- methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum, trioctylaluminum, tris-2-norbornylaluminum, and the like.

Dialkylaluminum halides such as dimethylaluminum chloride, diethylaluminum chloride, diisopropylaluminum chloride, diisobutylaluminum chloride, and the like.

Monoalkylaluminum dihalides such as methylaluminum dichloride, ethylaluminum dichloride, ethylaluminum diiodide, propylaluminum dichloride, isopropylaluminum dichloride, butylaluminum dichloride, isobutylaluminum dichloride, and the like.

Alkylaluminum sesquihalides such as methylaluminum sesquichloride, ethylaluminum sesquichloride, propylaluminum sesquichloride, isobutylaluminum sesquichloride, and the like.

In the practice of the present invention, the catalytic system obtained from the palladium ion source is utilized with a component selected from the group of organoaluminum compounds, third component compounds, and mixtures thereof.

Examples of such third components are Lewis acids such as the $BF_3$-etherate, $TiCl_4$, $SbF_5$, tris(perfluorophenyl) boron, $BCl_3$, $B(OCH_2CH_3)_3$; strong Brønsted acids such as hexafluoroantimonic acid ($HSbF_6$), $HPF_6$ hydrate, trifluoroacetic acid ($CF_3CO_2H$), and $FSO_3H.SbF_5$, $H_2C(SO_2CF_3)_2$ $CF_3SO_3H$, and paratoluenesulfonic acid; halogenated compounds such as hexachloroacetone, hexafluoroacetone, 3-butenoic acid-2,2,3,4,4-pentachlorobutylester, hexafluoroglutaric acid, hexafluoroisopropanol, and chloranil, i.e.,

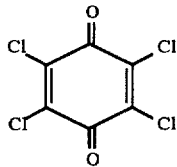

electron donors such as phosphines and phosphites and olefinic electron donors selected from ($C_4$–$C_{12}$) aliphatic and ($C_6$–$C_{12}$) cycloaliphatic diolefins, such as butadiene, cyclooctadiene, and norbornadiene.

Acidity of strong Brønsted acids can be gauged by determining their Hammet acidity function $H_0$. A definition of the Hammet acidity function is found in Advanced Inorganic Chemistry by F. A. Cotton and G. Wilkinson, Wiley-Interscience, 1988, p. 107.

As set forth above the neutral ligands can be employed as optional third components with electron donating properties.

In one embodiment the multicomponent catalyst system can be prepared by a process which comprises mixing the catalyst components, i.e., the palladium metal compound, the organoaluminum compound, and third component (if employed), together in a hydrocarbon or halohydrocarbon solvent and then mixing the premixed catalyst system in the reaction medium comprising at least one functional NB-type monomer. Alternatively, (assuming the optional third component is utilized), any two of the catalyst system components can be premixed in a hydrocarbon or halohydrocarbon solvent and then introduced into the reaction medium. The remaining catalyst component can be added to the reaction medium before or after the addition of the premixed components.

In another embodiment, the multicomponent catalyst system can be prepared in situ by mixing together all of the catalyst components in the reaction medium. The order of addition is not important.

Reactions utilizing the single and multicomponent catalysts of the present invention are carried out in an organic solvent which does not adversely interfere with the catalyst system and is a solvent for the monomer. Examples of organic solvents are aliphatic (non-polar) hydrocarbons such as pentane, hexane, heptane, octane and decane; alicyclic hydrocarbons such as cyclopentane and cyclohexane; aromatic hydrocarbons such as benzene, chlorobenzene, nitrobenzene, toluene, and xylenes; halogenated (polar) hydrocarbons such as methylene chloride, chloroform, carbon tetrachloride, ethyl chloride, 1,1-dichloroethane, 1,2-dichloroethane, 1,2-dichloroethylene, 1-chloropropane, 2-chloropropane, 1-chlorobutane, 2-chlorobutane, 1-chloro-2-methylpropane, and 1-chloropentane. In the single component catalyst systems of this invention cyclohexanone, ethylacetate can also be employed.

The choice of reaction solvent is made on the basis of a number of factors including the choice of catalyst and whether it is desired to run the polymerization as a slurry or solution process. For most of the catalysts described in this invention, the preferred solvents are chlorinated hydrocarbons such as methylene chloride and 1,2-dichloroethane and aromatic hydrocarbons such as chlorobenzene and nitrobenzene, with simple hydrocarbons being less preferred due to the resulting lower conversion of the functional NB-type monomer(s). Surprisingly the inventors have discovered that certain of the catalyst systems, most notably the multicomponent catalysts based on palladium metal compounds and alkylaluminum halides, specifically, monoalkylaluminum dihalides, (e.g., ethylaluminum dichloride), also give excellent results (and high monomer conversion) when run in simple hydrocarbons such as heptane and cyclohexane.

The molar ratio of total monomer to palladium metal for the single and multicomponent catalysts can run from 20:1 to 100,000:1, preferably 200:1 to 20,000:1, and most preferably 1,000:1 to 10,000:1.

In the multicomponent catalyst systems, aluminum metal to palladium metal molar ratio ranges from less than or equal to 100:1, preferably less than or equal to 30:1, and most preferably less than or equal to 20:1.

The optional third component is employed in a molar ratio to palladium metal ranging from 0.25:1 to 20:1. When acids are employed as third components, the acid to palladium metal range is less than or equal to 4:1, preferably less than or equal to 2:1.

The temperature at which the polymerization reactions of the present invention are carried out typically ranges from $-100°$ C. to $120°$ C., preferably $-60°$ C. to $90°$ C., and most preferably $-10°$ C. to $80°$ C.

The optimum temperature for the present invention is dependent on a number of variables, primarily the choice of catalyst and the choice of reaction diluent. Thus, for any given polymerization the optimum temperature will be experimentally determined taking these variables into account.

To control the rate of the polymerization reactions carried out with the single or multicomponent catalyst systems of this invention, a suitable monomer to catalyst molar ratio is selected, the reactor can be cooled to slow down the reaction, and the reaction can be carried out in a high boiling solvent. By high boiling solvent is meant that the solvent has a boiling point above the polymerization temperature. If a pressure reaction vessel is employed to contain the polymerization reaction, the foregoing considerations do not have to be taken into account.

Monomers

The functional NB-type monomers suitable for use in the invention are represented by the following structural formula:

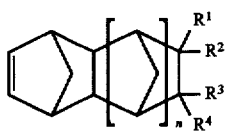

wherein $R^1$ to $R^4$ independently represent hydrogen; hydrocarbyl selected from the group of linear and branched ($C_1$–$C_{20}$) alkyl, ($C_6$–$C_{12}$) aryl, or a functional substituent selected from the group —$(CH_2)_m$—OH, —$(CH_2)_m$—C(O) —OH, —$(CH_2)_m$—C(O)OR", —$(CH_2)_m$—OR", —$(CH_2)_m$—OC(O)R", —$(CH_2)_m$—OC(O)OR", —$(CH_2)_m$—C(O)R", —$(CH_2)_m$—O—$(CH_2)_m$—OH, —$(CH_2)_m$OR" wherein m independently is an integer from 0 to 10 and R" represents linear or branched ($C_1$–$C_{10}$) alkyl or the group:

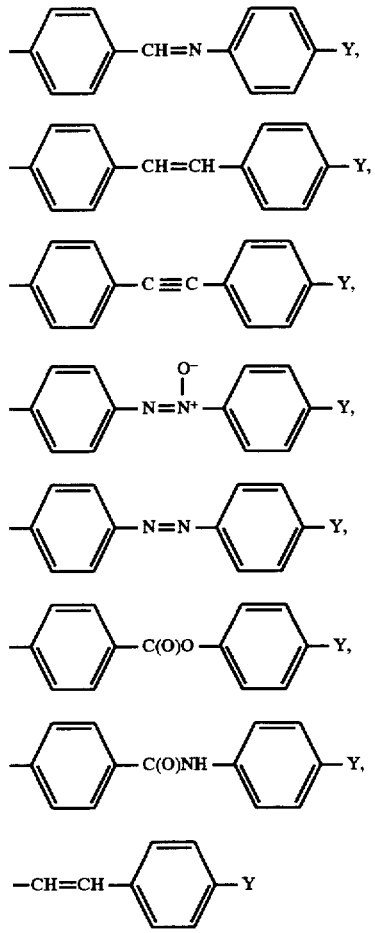

wherein Y is hydrogen, $C_zH_{2z+1}$, $C_zH_{2z+1}O$, $C_zH_{2z+1}OC(O)$, or —CN, wherein z is an integer from 1 to 12; any of $R^1$ and $R^2$ or $R^3$ and $R^4$ can be taken together to form a ($C_1$–$C_{10}$) alkylidene group (e.g., =$CH_2$, =CH—$CH_3$, etc.) $R^1$ and $R^4$, can be taken together with the ring carbon atoms to which they are attached to form an anhydride or dicarboxyimide group as shown in the structures below:

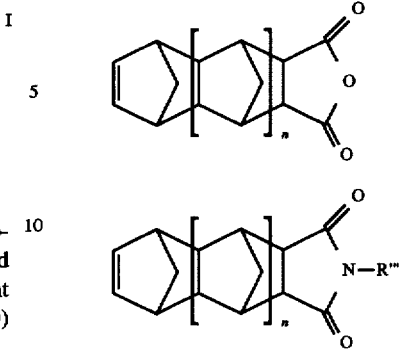

wherein n is as previously defined and R'" is linear and branched ($C_1$–$C_{20}$)alkyl, ($C_6$–$C_{12}$)aryl, ($C_7$–$C_{15}$)aralkyl representative substituents include methyl, ethyl, n-propyl, i-propyl, n-butyl, t-butyl, pentyl, hexyl, decyl, phenyl, and benzyl. At least one of $R^1$ to $R^4$ must be a functional substituent.

In Formula I above, n is preferably 0 or 1 as represented by the structures below:

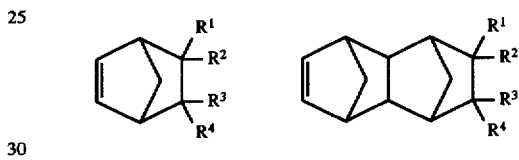

wherein $R^1$ to $R^4$ are as defined above. Preferred substituents include hydroxy, hydroxyalkyl, alkoxy, alkoxyalkyl, carboxy, carboxyalkyl, alkoxycarbonyl, alkycarbonyloxy, alkoxycarbonyloxy, alkylcarbonyl, and a methylene (—$CH_2$—) or linear polymethylene (—$CH_2$—)$_m$ moiety terminated with an alkoxycarbonyl-, alkylcarbonyloxy-, alkoxycarbonyloxy-, alkylcarbonyl-, and hydroxyalkyloxy- group. Representative monomers include 5-hydroxy-2-norbornene, 5-hydroxymethyl-2-norbornene, 5-methoxy-2-norbornene, 5-t-butoxycarbonyl-2-norbornene, 5-methoxycarbonyl-2-norbornene, 5-carboxy-2-norbornene, 5-carboxymethyl-2-norbornene, decanoic acid of 5-norbornene-2-methanol, octanoic acid ester of 5-norbornene-2-methanol, n-butyric acid ester of 5-norbornene-2-methanol, phenylcinnaminic acid ester of 5 - n o r b o r n e n e - 2 - m e t h a n o l ; N-phenylnorbornedicarboximide, and 5-norbornene-2,3-dicarboxylic anhydride.

The hydrocarbyl substituted NB-type monomers suitable for use in the present invention are represented by the structural formula depicted below.

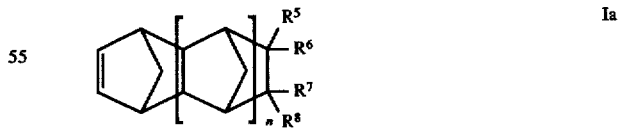

wherein $R^5$, $R^6$, $R^7$, and $R^8$ independently represent hydrogen, linear and branched ($C_1$–$C_{20}$) alkyl, hydrocarbyl substituted and unsubstituted ($C_5$–$C_{12}$) cycloalkyl, ($C_6$–$C_{40}$) aryl, ($C_7$–$C_{15}$) aralkyl, ($C_3$–$C_{20}$) alkynyl, linear and branched ($C_3$–$C_{20}$) alkenyl, (with the proviso that the alkenyl radical does not contain a terminal double bond when a CTA is employed, that is the double bond in the radical is an internal olefinic bond) or vinyl; any of $R^5$ and $R^6$ or $R^7$ and $R^8$ can be taken together to form a ($C_1$–$C_{10}$) alkylidene group, $R^5$ and $R^8$ when taken with the two ring carbon atoms to which they are attached can represent saturated and unsaturated cyclic groups containing 4 to 12 carbon atoms or an aromatic ring containing 6 to 17 carbon atoms; and n is 0, 1, 2, 3, or 4. By hydrocarbyl is meant that the substituent (s) is hydrogen or is composed solely of carbon and hydrogen atoms. These substituents are devoid of any polar functionality (e.g., oxygen and nitrogen atoms).

Examples of hydrocarbyl substituted monomers include 2-norbornene, 5-methyl-2-norbornene, 5-hexyl-2-norbornene, 5-decyl-2-norbornene, 5-phenyl-2-norbornene, 5-naphthyl-2-norbornene 5-ethylidene-2-norbornene, vinylnorbornene, dicyclopentadiene, dihydrodicyclopentadiene, tetracyclododecene, methyltetracyclododecene, tetracyclododecadiene, dimethyltetracyclododecene, ethyltetracyclododecene, ethylidenyl tetracyclododecene, phenyltetracyclododecene, trimers of cyclopentadiene (e.g., symmetrical and asymmetrical trimers).

One or more of the monomers described under Formula I can be polymerized in the presence of the catalyst systems of the present invention. In addition one or more of the monomers set forth under Formula I can be copolymerized with one or more of the hydrocarbyl NB-type monomers described under Formula Ia. Surprisingly, the Catalyst systems of the present invention catalyze the polymerization of both the exo and endo isomers of functional NB-type and hydrocarbyl NB-type monomers to high conversions and molecular weights. The incorporation of exo and endo isomer repeat units into the polymer can range from 0 to 100 mole (weight) percent exo content to 100 to 0 mole weight percent endo content. The present invention thus contemplates a broad class of polymers, all composed of endo and/or exo isomer repeating units derived from functional NB-type monomers alone or in combination with a hydrocarbyl substituted NB-type monomer.

The polymers of the present invention are represented by the following formulae:

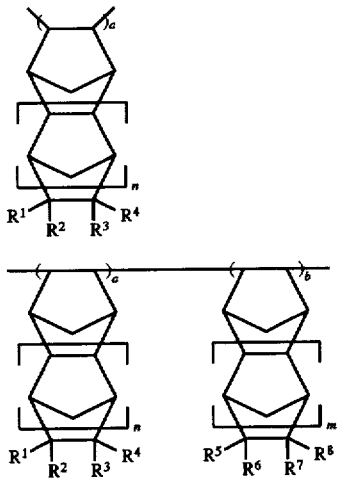

IIIa

IIIb wherein $R^1$ to $R^8$ are as defined above and n and m independently are 0, 1, 2, 3, or 4; a and b represent the number of repeat units derived from the respective monomers. It is to be understood that the monomers insert into the growing polymer chain in a random fashion. The repeat units insert via 2,3-enchainment into the polymer backbone. It should also be understood that when any of $R^1$ to $R^4$ represents the radical —$CH_2$—O—C(O)—R, wherein R is ($C_1$-$C_{15}$) alkyl or aryl, this invention only contemplates polymers containing a mole (weight) percentage of endo NB-type repeat units equal to or greater than the mole (weight) percentage of exo NB-type repeat units. In this embodiment of the invention the endo/exo content of repeat units ranges from 50:50 to 100:0 endo:exo NB-type repeat units based on mole (weight) percent. Preferably from 50:50 to 95:5 endo/exo content, most preferably from 65:35 to 90:10 endo/exo content.

The polymers obtained by the process of the present invention can be produced in molecular weights above 10,000 $M_n$. Polymers in the molecular range from 10,000 to 2,000,000, preferably from 10,000 to 1,000,000, more preferably from 25,000 to 500,000 can be prepared.

Lower molecular weight polymers may also be formed in the range from about 500 to above 10,000 by carrying out the polymerization in the presence of a chain transfer agent. The (Chain Transfer Agent) CTA is selected from a compound having a terminal olefinic double bond between adjacent carbon atoms, wherein at least one of the adjacent carbon atoms has two hydrogen atoms attached thereto. The CTA is exclusive of styrenes (non-styrenes), vinyl ethers (non-vinyl ether) and conjugated dienes. By non-styrenic, non-vinyl ether is meant that compounds having the following structures are excluded from the chain transfer agents of this invention:

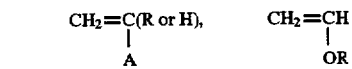

wherein A is an aromatic substituent and R is hydrocarbyl.

The preferred CTA compounds of this invention are represented by the following formula:

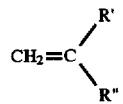

wherein R' and R" independently represent hydrogen, branched or unbranched ($C_1$ to $C_{40}$) alkyl, branched or unbranched ($C_2$ to $C_{40}$) alkenyl, halogen, or the group —$CH_2(CH_2)_n$—OR'"
—Si(OR'")$_3$
—($CH_2$)$_n$—Si(OR'")$_3$
—($CH_2$)$_n$—OSi(R'")$_3$
—$CH_2(CH_2)_n$—OH
—$CH_2(CH_2)_n$—NCO
—($CH_2$)$_n$—X $$-O-\overset{O}{\underset{\|}{C}}-CX_3$$

—$CO_2$—R'"

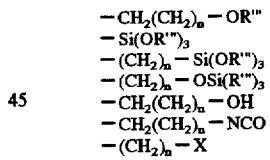

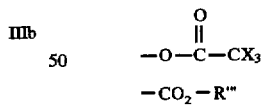

wherein R'" is branched or unbranched ($C_1$ to $C_{10}$)alkyl, preferably methyl or ethyl, branched or unbranched ($C_3$-$C_{90}$)alkenyl, substituted or unsubstituted ($C_6$-$C_{15}$)aryl wherein said substituents if present are selected from branched or unbranched ($C_1$-$C_{10}$)alkyl or haloalkyl, and halogen, X is chlorine, fluorine, bromine or iodine, and n is 0 to 20, preferably 1 to 5.

Of the above chain transfer agents the α-olefins having 2 to 10 carbon atoms are preferred, e.g., ethylene, propylene, 4-methyl-1-pentene, 1-decene, 1,7-octadiene, and 1,6-octadiene, or isobutylene.

While the optimum conditions for any given result should be experimentally determined by a skilled artisan taking into the account all of the above factors there are a number of general guidelines which can be conveniently utilized where appropriate. We have learned that, in general, α-olefins (e.g., ethylene, propylene, 1-decene, 4-methyl-1-pentene) are the most effective chain transfer agents with 1,1-disubstituted olefins (e.g., isobutylene) being less efficient. In other words, all other things being equal, the concentration of isobutylene required to achieve a given molecular weight will be much higher than if ethylene were chosen. Styrenic olefins, conjugated dienes, and vinyl ethers are not effective as chain transfer agents due to their propensity to polymerize with the catalysts described herein.

The CTA can be employed in an amount ranging from about 0.10 mole % to over 50 mole % relative to the moles of total NB-type monomer. Preferably, the CTA is employed in the range of 0.10 to 10 mole %, and more preferably from 0.1 to 5.0 mole %. As discussed above, depending on catalyst type and sensitivities, CTA efficiencies and desired end group, the concentration of CTA can be in excess of 50 mole % (based on total NB-functional monomer present), e.g., 60 to 80 mole %. Higher concentrations of CTA (e.g., greater than 100 mole %) may be necessary to achieve the low molecular weight embodiments of this invention such as in oligomer and micromonomer applications. It is important and surprising to note that even such high concentrations the CTA's do not copolymerize into the polymer backbone but rather insert as terminal end-groups on each polymer chain. Besides chain transfer, the process of the present invention affords a way by which a terminal α-olefinic end group can be placed at the end of a polymer chain.

As previously discussed, polymers produced in the presence of a CTA of this invention have an olefinic end group attached to a terminal end thereof as shown in the structures below:

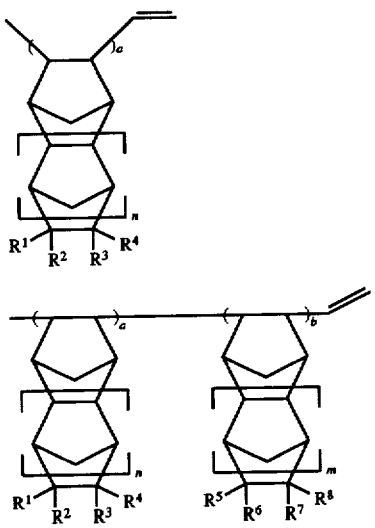

IVa

IVb wherein $R^1$ to $R^8$, n, m, a, and b are described above. In the foregoing structure, the olefinic end group was derived from an ethylene chain transfer agent. It is understood that the olefinic end group will differ according to the type of CTA used in the polymerization medium.

CTA terminated polymers of the above formulae can be prepared in molecular weights ranging from 500 to 2,000,000 or more, preferably from 3,000 to 1,000,000, more preferably 20,000 to 500,000, and most preferably from 50,000 to 500,000.

The CTA's of the present invention can be utilized to produce macromonomers or oligomers having from 4 to 50, preferably 4 to 20 functional NB-type repeating units (e.g., functional NB's alone or in combination with hydrocarbyl substituted NB's). To make functional NB-type macromonomers the molar amount of CTA can be calculated to tailor the length of the polymer chain. A terminal end of the macromonomer chain will contain olefinic unsaturation derived from the CTA.

In the case of olefinic terminated polymers of this invention there are no limitations on molecular weight or the ratio of endo/exo monomer repeating unit incorporated into the polymer chain.

In the following illustrative examples various catalysts are prepared and used in the preparation of functionally substituted norbornene-type polymers.

COMPARATIVE EXAMPLES

Examples A through F were run to compare the effectiveness of allylpalladium chloride dimer catalysts disclosed in U.S. Pat. No. 3,330,815 to catalyze the polymerization of functional NB-type monomers alone or in combination with other NB-type monomers, e.g., norbornene. The '815 catalysts do not contain a palladium cation complex in association with a weakly coordinating counteranion. Moreover, the '815 catalysts contain a halide and/or neutral monodentate or bidentate ligands. There is no disclosure of allylpalladium cation complex devoid of halide or any other ligand as set forth for the preferred single component catalysts of this invention. Molecular weights above 10,000 were not attainable as shown in the following comparative examples.

EXAMPLE A

This example illustrates the homopolymerization of the octanoic acid ester of 5-norbornene-2-methanol with allylpalladium chloride dimer in chlorobenzene at 20° C.

A Schlenk flask was charged under nitrogen with 15 mg (41 μmol) allylpalladium chloride dimer, 2.084 g (8.34 mmol) of the octanoic acid ester of 5-norbornene-2-methanol (exo/endo=20/80) and 4 ml of dry chlorobenzene (mole ratio of monomer to Pd=101/1). The reaction mixture was stirred at 20° C. for 7 days. Then, the polymer was precipitated with a mixture of 50 ml of methanol and 1 ml of concentrated HCl. The oily polymer was isolated by decanting off the supernatant liquid, washed with methanol and dried under vacuum (60° C., 0.01 torr). Yield: 146 mg (7%). $M_n$ (GPC)=2,000, $M_w$ (GPC)=3,500 (calibration with polystyrene standards).

EXAMPLE B

This example illustrates the homopolymerization of the octanoic acid ester of 5-norbornene-2-methanol with allylpalladium chloride at 100° C. (neat).

Under nitrogen, a Schlenk flask was charged with 15 mg (41 μmol) of allylpalladium chloride dimer and 2.034 g (8.14 mmol) of the octanoic acid ester of 5-norbornene-2-methanol (exo/endo=20/80) (mole ratio of monomer to Pd=99/1). The reaction mixture was stirred at 100° C. for 7 days. The polymer was isolated as described in Example A. Yield: 940 mg (47%). $M_n$ (GPC)=3,000, $M_w$ (GPC)=4,500 (calibration with polystyrene standards).

EXAMPLE C

This example illustrates homopolymerization of the decanoic ester of 5-norbornene-2-methanol (neat) with allylpalladium chloride dimer at a reaction temperature of 140° C.

The polymerization of 0.7 g (2.54 mmol) of the decanoic ester of 5-norbornene-2-methanol (exo/endo=20/80) and 4.6 mg (12.6 μmol) of allylpalladium chloride dimer was carried out at 140° C. for 4 days (mole ratio of monomer to Pd=100/1). After cooling to 20° C., 2 ml of chlorobenzene was added to dissolve the polymer. The resulting solution was added to 30 ml of methanol to precipitate the polymer. The supernatant liquid was decanted off, the remaining oil carefully washed with methanol and dried at 60° C. and 0.01 torr. A yield of 420 mg (60%) of ester substituted polymer was obtained with $M_n$ (GPC)=4,500 and $M_w$ (GPC)=7,000 (calibration with polystyrene standards).

EXAMPLE D

This example illustrates the copolymerization of norbornene and the octanoic ester of 5-norbornene-2-methanol with allylpalladium chloride dimer (neat) at 60° C.

Under nitrogen, a Schlenk flask was charged with 16 mg (44 μmol) of allylpalladium chloride dimer and a mixture of 0.629 g (6.7 mmol) of norbornene and 0.687 g (2.75 mmol) of the octanoic acid ester of 5-norbornene-2-methanol (exo/endo=20/80) (mole ratio of total monomer to Pd=107/1, mole ratio of norbornene to norbornene ester=71/29). This mixture was heated to 60° C. for 7 days. The gray colored viscous mixture was then added to a mixture of 50 ml of methanol and 1 ml of concentrate HCl to precipitate the polymer. The waxy polymer was filtered, washed with methantol, and dried at 70° C. and 0.01 torr. Yield: 260 mg (20%), $M_n$ (GPC)=3,500, $M_w$ (GPC)=6,000 (calibration with polystyrene standards).

EXAMPLE E

This example illustrates the copolymerization of norbornene and the octanoic ester of 5-norbornene-2-methanol with allylpalladium chloride dimer (in chlorobenzene) at 20° C.

A mixture of 16 mg (44 μmol) of allylpalladium chloride dimer, 0.619 g (6.6 mmol) of norbornene, 0.681 g (2.72 mmol) of the octanoic ester of 5-norbornene-2-methanol (exo/endo=20/80) and 4 ml of chlorobenzene was reacted at 20° C. for 7 days (mole ratio of total monomer to Pd=106/1, mole ratio of norbornene to norbornene ester=71/29). Then, the polymer was precipitated with a mixture of 50 ml of methanol and 1 ml of concentrate HCl. The polymer was filtered, washed with methanol, and dried at 60° C. and 0.01 torr. Yield of the polymer: 520 mg (40%). The polymer was dissolved in 3 ml of chlorobenzene and 0.2 ml of methanol. Then, 50 mg of $NaBH_4$ was added, and the mixture was stirred at 20° C. for 6 hours. The black precipitate of Pd(0) was filtered off over alumina, an additional 5 ml of chlorobenzene was used to extract residual polymer from the alumina. The volume of the solution was reduced to 3 ml under a vacuum of 0.4 torr. The polymer was precipitated with a mixture of 50 ml of methanol and 1 ml of concentrate HCl. The polymer was isolated, washed, and dried as described above. This polymer was used for GPC analysis: Mn (GPC)=2,900, $M_w$ (GPC)=5,700 (calibration with polystyrene standards).

EXAMPLE F

The copolymerization of a norbornene and the decanoic ester of 5-norbornene-2-methanol (neat) with allylpalladium chloride dimer at 100° C. and 140° C. was conducted as follows.

A mixture of 13 mg (36 μmol) of allylpalladium chloride dimer, 0.54 g (5.7 mmol) of norbornene and 0.4 g (1.44 mmol) of the decanoic acid ester of 5-norbornene-2-methanol (exo/endo =20/80) was heated to 100° C. for 3 days (mole ratio of total monomer to Pd=100/1, mole ratio of norbornene to norbornene ester=20/80). The reaction was interrupted 5 times and the mixture cooled to 20° C. for 20 minutes each time. During these periods, the top of the Schlenk flask was heated with a heat gun to return the small fraction of sublimed norbornene back to the bulk of the reaction mixture. Finally, the polymerization mixture was heated to 140° C. for 1 day (with 4 interruptions to heat the top of the Schlenk flask with a heat gun in order to return sublimed norbornene to the polymerization mixture). After cooling to 20 ° C., the dark solid was dissolved in 3 ml of chlorobenzene, and the resulting solution was added to 60 ml of methanol to precipitate the gray polymer. The polymer was isolated, dried, and purified by reduction with $NaBH_4$ as described in Example E. Yield: 564 mg (60%), $M_n$ (GPC) =2,300 and $M_w$ (GPC)=3,650 (calibration with polystyrene standards). This material also contained approximately 10% of insoluble polymer.

Examples G and H demonstrate that the catalyst system disclosed by Breunig and Risse, *Makromol. Chem.* 193, 2915 (1992), are not effective in polymerizing endo-isomers of functional NB-type monomers. The Breunig/Risse catalysts do not contain the allylpalladium functionality which make up the cation complex of the single component catalyst systems present invention.

EXAMPLE G

This example sets forth the homopolymerization of the octanoic ester of 5-norbornene-2-methanol with [Pd $(C_2H_5CN)_4][BF_4]_2$ in dichloromethane/nitromethane.

Under nitrogen, a catalyst solution was prepared from 25 mg (50 μmol) of $[Pd(C_2H_5CN)_4][BF_4]_2$ and 1 ml of dry dichloromethane. A monomer solution of 1.012 g (4.1 mmol) of the octanoic acid ester of 5-norbornene-2-methanol (exo/endo=20/80) in 4 ml of dry nitromethane was added via syringe (mole ratio of monomer to Pd=81/1). The reaction mixture was stirred for 5 days at 20° C. The polymer was isolated by precipitation with 50 ml of methanol (no acid added!). The cloudy mixture was left standing for 24 hours and the polymer settled in form of an oil on the bottom of the flask. The supernatant was decanted off, and the methanol and the nitromethane of this clear solution was removed under a vacuum of 0.4 torr (20° C.). A residue of 880 mg remained which was characterized as unreacted monomer with an exo/endo-ratio of 10/90. The analysis of the exo/endo-ratio was carried out by $^1H$ NMR spectroscopy, integration of the olefin signals at δ=5.90 and 6.12 ppm (oft he endo-isomer) and at δ=6.07 ppm (of the exo-isomer).

The oily polymer was carefully washed with methanol and dried at 60° C. and 0.01 torr. Yield=100 mg (10%) of polymer, $M_n$ (GPC)=2,500, $M_w$ (GPC) =3,300 (calibration with polystyrene standards).

EXAMPLE H

This example illustrates the homopolymerization of the octanoic ester of 5-norbornene-2-methanol with [Pd $(C_2H_5CN)_4][BF_4]_2$ in dichloromethane/nitrobenzene.

Under nitrogen, a catalyst solution was prepared from 21 mg (42 μmol) of $[Pd(C_2H_5CN)_4][BF_4]_2$ in 1 ml of dry dichloromethane. Via syringe, a monomer solution of 1.01 g (4.0 mmol) of the octanoic acid ester of 5-norbornene-2- methanol (exo/endo=20/80) in 4 ml of dry nitrobenzene was added (mole ratio of monomer to Pd=95/1). The reaction mixture was stirred for 5 days at 20° C. Then, the polymer was isolated and dried as described above. Yield: 400 mg (40%). $M_n$ (GPC) =6,800, $M_w$ (GPC)=8,700 (calibration with polystyrene standards).

Again, the composition of the monomer which remained unreacted during the polymerization was determined. $^1$H NMR spectroscopy was carried out on the residue obtained after removal of methanol and nitrobenzene from the clear supernatant under vacuum. The unreacted monomer was exclusively the endo-isomer, only olefin signals at d=5.90 and 6.12 ppm.

The NMR analysis of this and the previous example shows that the exo-isomer is more reactive than the endo-isomer.

EXAMPLE 1

Preparation of [6-methoxynorbornene-2-yl-5-palladium (cyclooctadiene)]hexafluorophosphate.

To a flask containing (norbornadiene)palladium dichloride (1.0 g, 3.7 mmol) and methanol (20 ml) was added a solution of potassium methoxide (0.256 g, 3.65 mmol) in methanol (20 ml), the addition being made at −78° C. After an hour at that temperature the mixture was allowed to warm to ambient temperature and was filtered and dried to afford a light green-brown solid (methoxynorbornenylpalladiumchloride dimer). A portion of this material (0.5 g, 1.65 mmol) was placed in a stirred flask with THF (50 ml) and COD (2 ml). Then a solution of thallium hexafluorophosphate (0.57 g, 1.65 mmol) in tetrahydrofuran (17 ml) was added at 0° C. After warming to room temperature the solvent was removed and then 1,2-dichloroethane (60 ml) was added to give a yellow solution and a pale colored precipitate (thallium chloride). The solution was filtered and the solvent removed under high vacuum to afford the product, identified hereafter as catalyst D, and referred to as methoxynorbornenyl-palladium (cyclooctadiene)]hexafluorophosphate (structure below) as a greenish solid.

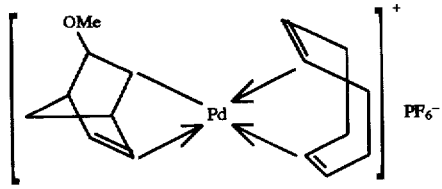

EXAMPLE 2

Preparation of [($\eta^3$-crotyl)(cycloocta-1,5-diene) palladium]hexafluorophosphate.

To a 500 ml Edenmeyer flask was added sodium chloride (2.95 g, 50.4 mmol), palladium dichloride (4.44 g, 25.3 mmol), methanol (150 ml) and water (2.25 g, 125 mmol). The resulting suspension was stirred at ambient temperature for an hour affording a dark-brown solution. To this solution was added crotyl bromide (7.6 ml, 74 mmol).

The vessel was then purged with carbon monoxide for 30 minutes (at a rate of 40 ml per minute). After several minutes the solution became lighter in color with a noticeable amount of a precipitate. The mixture was then poured into water (1 liter) affording an amber-brown colored solid. The mixture was extracted with 3 aliquots of chloroform (total volume 500 ml). Removal of the chloroform from the resulting solution afforded a yellow green solid which was characterized by proton NMR methods as ($\eta^3$-crotyl) palladium halide dimer. The yield was essentially quantitative. This yellow-green solid was dissolved in tetrahydrofuran (100 ml) and 1,5-cyclooctadiene (8.7 ml) was added. Thereafter thallium hexafluorophosphate (8.8 g, 25.3 mmol) was dissolved in THF and both solutions were cooled to 0° C. The thallium hexafluorophosphate solution was added slowly to the solution of the palladium compound. An immediate off-white precipitate was observed, the amount of which increased as more of the thallium solution was added.

After the addition was completed the ice-bath was removed and the suspension was allowed to warm to ambient temperature, with stirring. The THF was removed under vacuum and dichloromethane (100 ml) was added. The mixture was filtered and the solution was concentrated to a volume of about 40 ml. To this solution was added diethylether (100 ml) which resulted in the formation of light yellow-white crystals in high yield. The crystals are identified hereafter as catalyst E, and referred to as [($\eta^3$-crotyl) (cycloocta-1,5-diene)-palladium]hexafluorophosphate. The material was characterized by NMR spectroscopic methods.

EXAMPLE 3

The decanoic acid ester of 5-norbornene-2-methanol (exo/endo 20/80) was weighed into a Schlenk flask (1.03 g, $3.70\times10^{-3}$ moles). ((Allyl)PdCl)$_2$ complex (13.15 mg, $3.60 \cdot 10^{-5}$ mole) and AgSbF$_6$ (35 mg, $10.1\times10^{-5}$ mole) was weighed into a sample vial inside a sealed glove box under Argon gas. Two ml of chlorobenzene was then added into the ((allyl)PdCl)$_2$/AgSbF$_6$ mixture and stirred for 20 minutes. Precipitated AgCl was filtered out using a micropore syringe filter. The solution was then added into the monomer and the resulting mixture was stirred for 24 hours. The solution became very viscous and the polymer formed was precipitated in methanol, filtered, and dried at 60° C. under vacuum for 12 hours. The recovered polymer was sticky. The polymer yield was 98% (1.01 g). The polymer was soluble in CHCl$_3$ and C$_6$H$_5$Cl. GPC analysis (based on polystyrene) showed that Mn=26,870 and Mw=58,848. Proton NMR analysis showed a signal at 4.0 ppm corresponding to the CH$_2$OC(O) protons. Infrared analysis revealed a signal at 1740 cm$^{-1}$ which is assigned to the ester carbonyl group.

EXAMPLE 4

One gram ($3.60\times10^{-3}$ moles) of the decanoic acid ester of 5-norbornene-2-methanol (exo/endo 20/80) was weighed into a Schlenk flask. ((Allyl)PdCl)$_2$ complex (0.0132 g, $3.60\times10^{-5}$ mole) and AgBF$_4$ (0.020 g $10.3\times10^{-3}$ mole) was weighed into a sample vial inside a sealed glove box under Argon gas. Two ml of anhydrous C$_6$H$_5$Cl was then added to the ((allyl)PdCl)$_2$/AgBF$_4$ mixture and stirred for 10 minutes to form a catalyst solution. AgCl was precipitated and filtered off using a micropore syringe filter. The catalyst solution was added into the monomer. The reaction mixture was initially light yellow in color and became brighter after an hour. The reaction mixture was stirred for 48 hours and the polymer formed was precipitated in methanol and filtered and dried under vacuum at 70° C. for 12 hours. The recovered polymer was very sticky. The polymer yield was 0.97 g (97%). The polymer was soluble in CHCl$_3$ and C$_6$H$_5$Cl. GPC done in C$_6$H$_5$Cl showed M$_w$=23,049.

EXAMPLE 5

Norbornene (0.58 g, 6.17×10$^{-3}$ mole) and the decanoic ester of 5-norbornene-2-methanol (20/80 exo/endo) (0.42 g, 1.51×10$^{-3}$ mole) (80:20 monomer ratio) was weighed into a Schlenk flask in a sealed glove box under inert gas. 0.5 ml of chlorobenzene was stirred into the monomer mixture. After stirring, 18 µl of distilled water was added into the monomer solution under N$_2$ and stirred for 10 minutes. A catalyst solution was prepared by weighing ((allyl)PdCl)$_2$ complex (12.13 mg, 3.36×10$^{-5}$ mole) and AgSbF$_6$ (30 mg, 8.7×10$^{-5}$ mole) into a sample vial and 2.5 ml of C$_6$H$_5$Cl (anhydrous) was added to the mixture. This mixture was then stirred for 20 minutes. AgCl was filtered off from the catalyst solution using a micropore syringe filter and the supernatant was added to the monomer solution and stirred for 18 hours. The reaction solution became very viscous in 1 hour. Polymer formed was precipitated in methanol and dried under vacuum at 70° C. for 12 hours. The polymer yield was 0.844 g (84%). The polymer was soluble in CHCl$_3$, and C$_6$H$_5$Cl but insoluble in C$_2$H$_4$Cl$_2$ and CH$_2$Cl .

GPC analysis showed that a low molecular weight species of the polymer was present so the polymer was dissolved in chloroform, precipitated in CH$_2$Cl$_2$, filtered and dried under vacuum for 12 hours. The final yield was 0.41 g (41%). Mn=151,796, Mw=367,507. Proton NMR analysis showed that the norbornene ester has been incorporated into the polymer (δ=4.0 ppm) (broad corresponding to CH$_2$OC(O). Integration of the signal at 0.9 ppm (CH$_3$) gives the mole percentage of incorporated ester units as 18 percent.

EXAMPLE 6

Norbornene (0.516 g, 5.49×10$^{-3}$ mole) and decanoic ester of 5-norbornene-2-methanol (exo/endo 20/80) (0.38 g, 1.37×10$^{-3}$ mole) (80:20 ratio) was weighed into a Schlenk flask inside a sealed glove box under inert gas. 0.5 ml of chlorobenzene was then added to the monomer mixture. ((Allyl)PdCl)$_2$ complex (25 mg, 6.83×10$^{-5}$ mole) and AgBF$_4$ (35 mg, 17.9×10$^{-5}$ mole) was weighed into a sample vial and 1.5 ml of chlorobenzene (anhydrous) was added to the mixture and stirred for 10 minutes to form a catalyst solution. AgCl was filtered off from the catalyst solution using a micropore syringe filter. All of the catalyst solution was then added to the monomer solution.

The reaction mixture became very viscous in 15 minutes. The mixture was allowed to continue to react overnight and polymer formed was precipitated in methanol. Time of reaction was 12 hours. The polymer was filtered and dried under vacuum at 70° C. for 12 hours. The yield was 0.842 g (94%). The polymer was soluble in CHCl$_3$ and C$_6$H$_5$Cl. Mn=40,351 and Mw=103,447. Proton NMR analysis (δ=0.9 ppm) indicates that the polymer contains 18 mole percent of incorporated norbornene ester units.

EXAMPLE 7

Norbornene (0.247 g, 2.63×10$^{-3}$ mole) the methyl ester of norbornene (0.103 g, 0.68×10$^{-3}$ mole) (80:20 ratio) were weighed into a Schlenk flask. Three ml of chlorobenzene was then added to the monomer mixture. In a sealed glove box under inert gas, (Pd(allyl)Cl)$_2$ complex (12.03 mg, 3.289×10$^{-5}$ mole) and AgSbF$_6$ (8.73×10$^{-5}$ mole, 30 mg) was weighed into another Schlenk flask and 2 ml of chlorobenzene was added and stirred for 25 minutes to form a catalyst solution. To the monomer solution was added 13 µl of distilled water. The solution was stirred for 20 minutes under N$_2$. AgCl precipitate was then filtered off from the catalyst solution which was then added to the monomer solution under N$_2$ and stirred for 24 hours. The resulting polymer was precipitated in methanol, filtered, and dried under vacuum for 12 hours. The polymer yield was 0.275 g (78.5%). The polymer was soluble in CHCl$_3$ and C$_6$H$_5$Cl. Mn=66,193 and Mw=183,665. Proton NMR analysis revealed a signol at δ=3.6 ppm corresponding to the C(O) OCH$_3$ protons. Integration showed that the polymer contained 12 mole percent of incorporated ester units.

EXAMPLE 8

Norbornene (0.247 g, 2.631×10$^{-3}$ mole) and the methyl ester of 5-norbornene-2-carboxylic acid (exo/endo 20/80) (0.10 g, 0.65×10$^{-3}$ mole) (80:20 monomer ratio) was weighed into a Schlenk flask in a sealed glove box under inert gas. One ml of C$_6$H$_5$Cl was then added to the monomer mixture. ((Allyl)PdCl)$_2$ complex (12.03 mg, 3.289×10$^{-5}$ mole) and AgBF$_4$ (20 mg, 10.2×10$^{-5}$ mole) was weighed into a sample vial to which was added 2 ml of C$_6$H$_5$Cl and stirred for 10 minutes. AgCl precipitate was filtered out using a micropore syringe filter. The catalyst solution prepared above was then added to the monomer solution. The reaction mixture was taken out of the glove box and kept under stirring for 25 hours. The obtained polymer was precipitated in methanol, filtered, and dried under vacuum at 70° C. for 5 hours.

The polymer yield was 0.360 g (100%). The polymer was soluble in CHCl$_3$ and C$_6$H$_5$Cl. Mn=10,688 and Mw=51,116. Integration of the proton NMR signal at δ=3.6 ppm showed that the polymer contains 8 mole percent of incorporated norbornene ester units.

EXAMPLE 9

Norbornene (0.2 g, 2.13×10$^{-3}$ mole) and 5-norbornene-2-carboxylic acid (endo isomer) (0.293 g, 2.13×10$^{-3}$ mole) (50:50 monomer ratio) was weighed into a Schlenk flask in a glove box under inert gas. One ml of chlorobenzene was added to the monomer mixture. ((Allyl)PdCl)$_2$ (16.2 mg, 6.64×10$^{-5}$ mole) and AgSbF$_6$ (35 mg, 10.18×10$^{-5}$ mole) was weighed into a sample vial to which was added 3 ml of chlorobenzene to form a catalyst solution. The catalyst solution was stirred for 20 minutes. AgCl precipitate was filtered out of the catalyst solution. The catalyst solution was then added to the monomer solution and stirred for 21 hours. The polymer formed was precipitated in methanol, filtered, and dried under vacuum for 12 hours.

The yield was 0.264 g (53.8%). The polymer was soluble in THF and insoluble in CHCl$_3$ and C$_6$H$_5$Cl. Infrared analysis revealed a signol at 1690 cm$^{-1}$ which shows that the norbornene carboxylic acid was incorporated into the polymer.

EXAMPLE 10

Norbornene (0.531 g, 5.64×10$^{-3}$ mole) and 5-norbornene 2-carboxylic acid (endo isomer) (1.33×10$^{-3}$ mole, 0.183 g) (80:20 monomer ratio) was weighed into a Schlenk flask in a glove box. Two ml of chlorobenzene was added to the monomer solution. ((Allyl)PdCl)$_2$ (6.65×10$^{-5}$ mole, 24.3 mg) and AgSbF$_6$ (55 mg, 16×10$^{-5}$ mole) was weighed into another Schlenk flask to which was then added 2 ml of chlorobenzene. The catalyst solution was stirred for 20 minutes and then precipitated AgCl was filtered off. Twenty-three µl of distilled water was added into the monomer solution and stirred for 20 minutes. The catalyst solution was then added to the monomer solution under nitrogen gas. The solution became very viscous within 5 minutes and formed a gel. After 45 minutes reaction time methanol was added to precipitate the polymer which was recovered as a white lump. The polymer was washed and dried under vacuum at 60° C. for 12 hours. The yield was 0.467 g (65%). The polymer was insoluble in $C_6H_5Cl$, $CHCl_3$, tetrachloroethylene and THF. An infrared signal at 1690 $cm^{-1}$ showed that the norbornene acid was incorporated into the polymer.

EXAMPLE 13

Copolymer of NB and the pentanoic acid ester of 5-norbornene-2-methanol.

To a 100 ml glass vial equipped with a Teflon® coated stir bar was added norbornene (4.15 g, 44 mmol), 1,2-dichloroethane (50 ml) and the pentanoic acid ester of 5-norbornene-2-methanol (1 g, 4.8 mmol, exo, endo 20/80).

TABLE I

| Example No | Monomer(s) | Monomer Ratio | Solvent | Catalyst | Catalyst: Monomer | Reaction Time | Yield % | $M_n$ | $M_w$ |
|---|---|---|---|---|---|---|---|---|---|
| 3 | NB—$CH_2OCOC_9H_{19}$ | 100 | $C_6H_5Cl$ | $C_3H_5PdCl$ + $AgSbF_6$ | 1:100 | 24 hours | 98 | 26,870 | 58,868 |
| 4 | NB—$CH_2OCOC_9H_{19}$ | 100 | $C_6H_5Cl$ | $C_3H_5PdCl$ + $AgBF_4$ | 1:100 | 48 hours | 97 | 9,641 | 23,049 |
| 5 | NB—$CH_2OCOC_9H_{19}$ | 80:20 | $C_6H_5Cl$ | $C_3H_5PdCl$ + $AgSbF_6$ | 1:250 | 24 hours | 84 | 151,796 | 367,507 |
| 6 | NB—$CH_2OCOC_9H_{19}$ | 80:20 | $C_6H_5Cl$ | $C_3H_5PdCl$ + $AgBF_4$ | 1:100 | 12 hours | 94 | 40,351 | 103,667 |
| 7 | NB—COOMe (1:20 water) | 80:20 | $C_6H_5Cl$ | $C_3H_5PdCl$ + $AgSbF_6$ | 1:100 | 24 hours | 78.5 | 64,493 | 183,665 |
| 8 | NB—COOMe | 80:20 | $C_6H_5Cl$ | $C_3H_5PdCl$ + $AgBF_4$ | 1:100 | 25 hours | 100 | 10,488 | 51,116 |
| 9 | NB—COOH | 50:50 | $C_6H_5Cl$ | $C_3H_5PdCl$ + $AgSbF_6$ | 1:100 | 21 hours | 53.8 | Soluble in THF | Soluble in THF |
| 10 | NB—COOH (1:20 water) | 80:20 | $C_6H_5Cl$ | $C_3H_5PdCl$ + $AgSbF_6$ | 1:100 | 45 min | 65 | Insoluble | |

NB represents norbornenyl

EXAMPLE 11

Copolymer of NB and the pentanoic acid ester of 5-norbornene-2-methanol.

To a 50 ml glass vial equipped with a Teflon® coated stir bar was added norbornene (2.21 g, 23.5 mmol), 1,2-dichloroethane (40 ml) and the pentanoic acid ester of 5-norbornene-2-methanol (1.11 g, 5.3 mmol, exo,endo 20/80). To this stirred solution at ambient temperature was added a catalyst solution prepared by reacting catalyst component A (methoxynorbornenylpalladiumchloride dimer) (73 mg, 138 µmol) with silver hexafluoroantimonate (95 mg, 277 µmol) in 1,2-dichloroethane (3 ml) for 30 minutes and then filtering through a micropore filter. The reaction was allowed to run for 16 hours before the reactor contents were poured into an excess of methanol. The polymer was washed with excess methanol and dried. The yield of copolymer was 2.73 g. The presence of the ester-bearing monomer in the copolymer was verified by infrared analysis which showed bands at 1741 $cm^{-1}$ (C=O stretch) and 1171 $cm^{-1}$ (C—O—C stretch) and the absence of unconverted monomer (proton NMR).

EXAMPLE 12

Copolymer of NB and the pentanoic acid ester of 5-norbornene-2-methanol.

To a 50 ml glass vial equipped with a Teflon® coated stir bar was added norbornene (2.17 g, 23 mmol), 1,2-dichloroethane (40 ml) and the pentanoic acid ester of 5-norbornene-2-methanol (1.11 g, 5.3 mmol, exo, endo 20/80). To this stirred solution at ambient temperature was added a catalyst solution prepared by reacting norbornadienepalladium dichloride (38 mg, 141 p. mol) with silver hexafluoroantimonate (96 mg, 279 µmol) in 1,2-dichloroethane (3 ml) for 30 minutes and then filtering through a micropore filter. The reaction was allowed to run for 16 hours before the reactor contents were poured into an excess of methanol. The polymer was washed with excess methanol and dried. The yield of copolymer was 2.08 g. The presence of the ester-bearing monomer in the copolymer was verified by infrared analysis which showed bands at 1741 $cm^{-1}$ (C=O stretch) and 1171 $cm^{-1}$ (C—O—C stretch) and the absence of unconverted monomer (proton NMR).

To this stirred solution at ambient temperature was added a catalyst solution prepared by reacting allylpalladium chloride dimer (9 mg, 25 µmol) with silver hexafluoroantimonate (18 mg, 52 µmol) in 1,2-dichloroethane (3 ml) for 30 minutes and then filtering through a micropore filter. The reaction was allowed to run for 20 hours before the reactor contents were poured into an excess of methanol. The polymer was washed with excess methanol and dried. The yield of copolymer was 4.61 g. The molecular weight of the copolymer was determined using GPC methods and found to be 46,250 ($M_w$) with a polydispersity of 2.6. The presence of the ester-bearing monomer in the copolymer was verified by infrared analysis which showed bands at 1741 $cm^{-1}$ (C=O stretch) and 1171 $cm^{-1}$ (C—O—C stretch) and the absence of unconverted monomer (proton NMR).

EXAMPLE 14

Copolymer of NB and the 5-t-butylester of norbornene carboxylic acid.

To a 100 ml glass vial equipped with a Teflon® coated stir bar was added norbornene (4.01 g, 42.6 mmol), 1,2-dichloroethane (50 ml) and the 5-t-butylester of norbornene carboxylic acid (2 g, 10.3 mmol, exo, endo mixture). To this stirred solution at ambient temperature was added a catalyst solution prepared by reacting allylpalladium chloride dimer (10 mg, 27.3 µmol) with silver hexafluoroantimonate (19.6 mg, 57 µmol) in 1,2-dichloroethane (3 ml) for 30 minutes and then filtering through a micropore filter. The reaction was allowed to run for 20 hours before the reactor contents were poured into an excess of methanol. The polymer was washed with excess methanol and dried. The yield of copolymer was 4.15 g. The molecular weight of the copolymer was determined using GPC methods and found to be 618,000 ($M_w$) with a polydispersity of 7.1.

EXAMPLE 15

Copolymer of NB and the 5-t-butylester of norbornene carboxylic acid.

To a 100 ml glass vial equipped with a Teflon® coated stir bar was added norbornene (3.75 g, 39.8 mmol), 1,2-dichloroethane (50 ml) and the 5-t-butylester of norbornene (2 g, 10.3 mmol, exo, endo mixture). To this stirred solution at ambient temperature was added palladium ethylhexanoate (12 μmol), tris(perfluorophenylborate) (108 μmol) and triethylaluminum (120 μmol). The reaction was allowed to run for 72 hours before the reactor contents were poured into an excess of methanol. The polymer was washed with excess methanol and dried, redissolved in chlorobenzene and reprecipitated with an excess of methanol, filtered and washed with methanol before finally drying in a vacuum oven overnight at 80° C. The yield of copolymer was 1.66 g. The molecular weight of the copolymer was determined using GPC methods and found to be 194,000 ($M_w$) with a polydispersity of 2.3. The presence of the ester-bearing monomer in the copolymer was verified by infrared analysis which showed bands at 1730 cm$^{-1}$ (C=O stretch) and 1154 cm$^{-1}$ (C—O—C stretch) and the absence of unconverted monomer (proton NMR).

EXAMPLE 16

Copolymer of NB and the phenylcinnamicester of 5-norbornene-2-methanol.

To a 50 ml glass vial equipped with a Teflon® coated stir bar was added norbornene (2.11 g, 22.4 mmol), 1,2-dichloroethane (30 ml) and the phenylcinnamateester of 5-norbornene-2-methanol (1.02 g, 4 mmol, exo, endo mixture). To this stirred solution at ambient temperature was added a catalyst solution prepared by reacting allylpalladium chloride dimer (36.7 mg, 100 μmol) with silver hexafluoroantimonate (76 mg, 208 μmol) in 1,2-dichloroethane (3 ml) for 30 minutes and then filtering through a micropore filter. The reaction was allowed to run for 3.5 hours before the reactor contents were poured into an excess of methanol. The polymer was washed with excess methanol and dried in a vacuum oven overnight at 80° C. The yield of copolymer was 2.78 g. The presence of the ester-bearing monomer in the copolymer was verified by infrared analysis which showed bands at 1719 cm$^{-1}$ (C=O stretch) and 1167 cm$^{-1}$ (C—O—C stretch) and the absence of unconverted monomer (proton NMR).

EXAMPLE 17

Copolymer of NB and N-phenylnorbornenedicarboximide.

To a 50 ml glass vial equipped with a Teflon® coated stir bar was added norbornene (1.72 g, 18.3 mmol), 1,2-dichloroethane (30 ml) and N-phenylnorbornenedicarboximide (1.01 g, 4.2 mmol, endo isomer). To this stirred solution at ambient temperature was added a catalyst solution prepared by reacting allylpalladium chloride dimer (38.5 mg, 106 μmol) with silver hexafluoroantimonate (78.5 mg, 228 μmol) in 1,2-dichloroethane (3 ml) for 30 minutes and then filtering through a micropore filter. The reaction was allowed to run for 3.5 hours before the reactor contents were poured into an excess of methanol. The polymer was washed with excess methanol and dried in a vacuum oven overnight at 80° C. The yield of copolymer was 1.71 g. The presence of the functional monomer in the copolymer was verified by infrared analysis which showed bands at 1722 cm$^{-1}$ (C=O stretch) and 1172 cm$^{-1}$ (C—O—C stretch) and the absence of unconverted monomer (proton NMR).

EXAMPLE 18

Copolymer of NB and N-phenylnorbornenedicarboximide.

To a 50 ml glass vial equipped with a Teflon® coated stir bar was added norbornene (2.08 g, 22.1 mmol), 1,2-dichloroethane (40 ml) and N-phenylnorbornenedicarboximide (1.01 g, 4.2 mmol, exo isomer). To this stirred solution at ambient temperature was added a catalyst solution prepared by reacting allylpalladium chloride dimer (39 mg, 107 μmol) with silver hexafluoroantimonate (73 mg, 212 μmol) in 1,2-dichloroethane (3 ml) for 30 minutes and then filtering through a micropore filter. The reaction was allowed to run for 70 hours before the reactor contents were poured into an excess of methanol. The polymer was washed with excess methanol and dried in a vacuum oven overnight at 80° C. The yield of copolymer was 2.11 g. The presence of the functional monomer in the copolymer was verified by infrared analysis which showed bands at 1725 cm$^{-1}$ (C=O stretch) and 1161 cm$^{-1}$ (C—O—C stretch) and the absence of unconverted monomer (proton NMR).

We claim:

1. A polycyclic addition polymer having a molecular weight above about 10,000 ($M_n$) consisting essentially of repeating units polymerized from one or more functionally substituted polycycloolefin(s) alone or in combination with one or more hydrocarbyl substituted polycycloolefin(s), wherein said functionally substituted polycycloolefin(s) and said hydrocarbyl substituted polycycloolefin(s) are represented by the formulae:

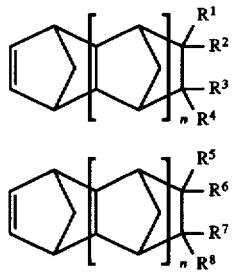

wherein the majority of said functionally substituted polycycloolefin(s) incorporated into said polymer is polymerized from the endo isomer, and wherein $R^1$ to $R^4$ independently represent hydrogen; hydrocarbyl selected from the group of consisting of linear and branched ($C_1$–$C_{20}$) alkyl, ($C_6$–$C_{12}$) aryl; or a functional substituent selected from the group —$(CH_2)_m$—OH, —$(CH_2)_m$—C(O)—OH, —$(CH_2)_m$—C(O)OR", —$(CH_2)_m$—OR", —$(CH_2)_m$—OC(O)OR", —$(CH_2)_m$—C(O)R", —$(CH_2)_m$—O—$(CH_2)_m$—OH, —$(CH_2)_m$OR" wherein m independently is 0 to 10 and R" represents linear or branched ($C_1$–$C_{10}$) alkyl or the group:

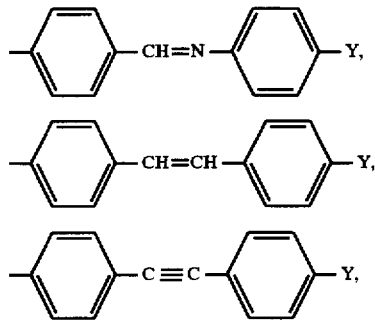

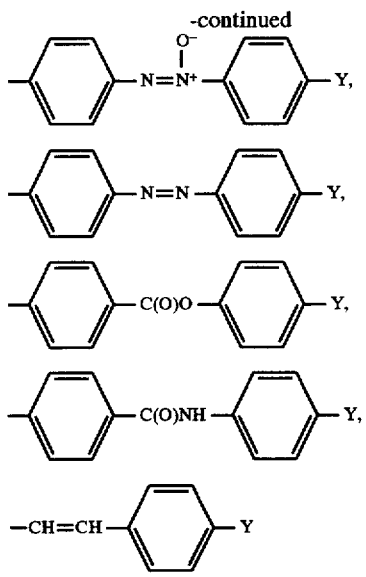

wherein Y is hydrogen, $C_zH_{2z+1}$, $C_zH_{2z+1}O$, $C_nH_{2z+1}OC(O)$, or —CN, wherein z is an integer from 1 to 12; $R^1$ and $R^2$ or $R^3$ and $R^4$ can be taken together to represent $(C_1-C_{10})$ alkylidine; $R^1$ and $R^4$ can be taken together with the ring carbon atoms to which they are attached to form an anhydride or dicarboxyimide group; wherein at least one of $R^1$ to $R^4$ must be a functional substituent; $R^1$ to $R^8$ independently represent hydrogen, linear and branched $(C_1-C_{20})$ alkyl, hydrocarbyl substituted and unsubstituted $(C_5-C_{12})$ cycloalkyl, $(C_6-C_{40})$ aryl, $(C_7-C_{15})$aralkyl, $(C_3-C_{20})$ alkynyl, linear and branched $(C_3+C_{20})$ alkenyl, or vinyl; any of $R^5$ and $R^6$ or $R^7$ and $R^8$ can be taken together to form a $(C_1-C_{10})$ alkylidene group; $R^5$ and $R^8$ when taken together with the two ring carbon atoms to which they are attached can represent saturated and unsaturated cyclic groups containing 4 to 12 carbon atoms or an aromatic ring containing 6 to 17 carbon atoms; and n is 0, 1,2, 3, or 4.

2. The polymer of claim 1 wherein the repeating units derived from the functionally substituted polycycloolefin have the following structure:

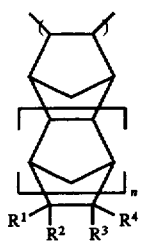

wherein $R^1$ to $R^4$ and n are as defined above.

3. The polymer of claim 1 wherein the repeating units derived from the functionally substituted polycycloolefin and hydrocarbyl substituted polycycloolefin have the following structure:

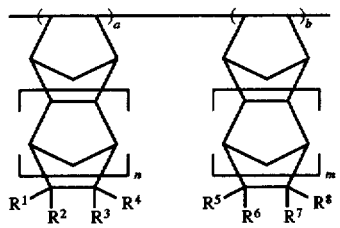

wherein $R^1$ to $R^8$ are defined as above; n and m' independently are 0, 1, 2, 3, or 4; and a and b represent the number of random repeating units in the polymer backbone.

4. A polycyclic addition polymer having a molecular weight above about 10,000 ($M_n$) consisting essentially of repeating units formed from one or more functionally substituted polycycloolefin(s) alone or in combination with one or more hydrocarbyl substituted polycycloolefin(s), wherein said functionally substituted polycycloolefin(s) and said hydrocarbyl substituted polycycloolefin(s) are represented by the formulae:

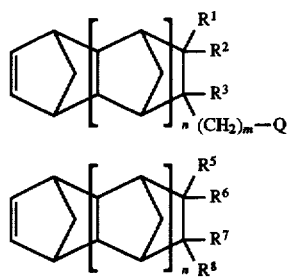

wherein n is 0 or 1; m is 0 to 10 $R^1$ to $R^3$ independently represent hydrogen; hydrocarbyl selected from the group of consisting of linear and branched $(C_1-C_{20})$ alkyl; $(C_6-C_{12})$ aryl; $R^1$ and $R^2$ taken together represent $(C_1-C_{10})$ alkylidene; and Q is a functional substituent selected from the group consisting of —OH, —C(O)—OH, —C(O)OR", —OR", —OC(O)OR", —C(O)R", —O—$(CH_2)_m$—OH, —OR", and —O—C(O)—R", where R" is linear or branched $(C_1-C_{10})$ alkyl, with the proviso that when m is I and Q is the radical —OC(O)—R (where R is alkyl or aryl), the endo isomer of said radical is present in an equal or greater proportion (in mole (weight) percent) than the exo isomer of said radical; $R^5$ to $R^8$ are independently hydrogen, linear and branched $(C_1-C_{20})$ alkyl; $(C_2-C_{20})$ alkenyl; any of $R^5$ and $R^6$ or $R^7$ and $R^8$) are taken together to form a $(C^1-C^{10})$ alkylidene group; $R^5$ and $R^8$ are taken together with the ring carbon atoms to which they are attached to form a saturated or unsaturated cyclic group of 4 to 12 carbon atoms.

5. The polymer of claim 1, 2, or 3 wherein $R^1$ to $R^3$ represent hydrogen and $R^4$ is a functional substituent selected from the group —$(CH_2)_m$—OH, —$(CH_2)_m$—C(O)—OH, —$(CH_2)_m$—C(O)OR", —$(CH_2)_m$—OR", —$(CH_2)_m$—OC(O)OR", —$(CH_2)_m$—C(O)R", —$(CH_2)_m$—O—$(CH_2)_m$—OH, —$(CH_mOR"$.

* * * * *